United States Patent
Sako et al.

(10) Patent No.: US 8,982,013 B2
(45) Date of Patent: Mar. 17, 2015

(54) DISPLAY APPARATUS AND DISPLAY METHOD

(75) Inventors: Yoichiro Sako, Tokyo (JP); Masaaki Tsuruta, Tokyo (JP); Taiji Ito, Kanagawa (JP); Masamichi Asukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 12/440,591

(22) PCT Filed: Aug. 17, 2007

(86) PCT No.: PCT/JP2007/066001
§ 371 (c)(1),
(2), (4) Date: Mar. 10, 2009

(87) PCT Pub. No.: WO2008/038473
PCT Pub. Date: Apr. 3, 2008

(65) Prior Publication Data
US 2009/0278766 A1    Nov. 12, 2009

(30) Foreign Application Priority Data

Sep. 27, 2006   (JP) ................................. 2006-261976

(51) Int. Cl.
*G09G 5/00*  (2006.01)
*G02B 27/01*  (2006.01)

(52) U.S. Cl.
CPC ...... *G02B 27/017* (2013.01); *G02B 2027/0118* (2013.01); *G02B 2027/0138* (2013.01); *G02B 2027/014* (2013.01); *G02B 2027/0185* (2013.01); *G02B 2027/0187* (2013.01)
USPC .............................................. 345/8; 345/156

(58) Field of Classification Search
CPC ............ G02B 27/017; G02B 27/0172; G02B 27/0176; G02B 2027/0174; G02B 2027/0178; G02B 2027/0118; G02B 2027/0187; G02B 2027/014; G02B 2027/0185; G02B 2027/0138
USPC ............ 345/7–8, 204–215, 87–104, 690–699
See application file for complete search history.

(56) References Cited

U.S. PATENT DOCUMENTS 4,868,652 A * 9/1989 Nutton .......................... 348/167
5,227,769 A * 7/1993 Leksell et al. ..................... 345/8
(Continued)

FOREIGN PATENT DOCUMENTS

CA    2 316 473 A1    1/2001
JP    3 189677         8/1991
(Continued)

OTHER PUBLICATIONS

Japanese Office Action issued Nov. 1, 2011 in patent application No. 2006-261976 with English translation.
(Continued)

*Primary Examiner* — Patrick F Marinelli
(74) *Attorney, Agent, or Firm* — Oblon, McClelland, Maier & Neustadt, L.L.P.

(57) ABSTRACT

An adequate display operation control in accordance with the external world situation is realized. For example, where a user wears the wearing unit of a spectacle-shaped or head-worn unit, the user is made to be able to view any type of image on the display section immediately in front of the eyes, and provided with taken images, reproduced images, and received images. At the point, a control relative to various display operations such as on/off of the display operation, display operation mode, and source change is carried out based on external world information.

31 Claims, 23 Drawing Sheets

(56) References Cited

U.S. PATENT DOCUMENTS

| | | | |
|---|---|---|---|
| 5,294,940 A * | 3/1994 | Wennagel et al. | 345/31 |
| 5,509,048 A * | 4/1996 | Meidan et al. | 455/564 |
| 5,742,263 A * | 4/1998 | Wang et al. | 345/8 |
| 5,815,126 A * | 9/1998 | Fan et al. | 345/8 |
| 5,892,519 A * | 4/1999 | Hirai | 345/440 |
| 5,905,525 A | 5/1999 | Ishibashi et al. | |
| 5,966,680 A | 10/1999 | Butnaru | |
| 5,978,015 A | 11/1999 | Ishibashi et al. | |
| 6,045,229 A * | 4/2000 | Tachi et al. | 353/28 |
| 6,091,546 A * | 7/2000 | Spitzer | 359/618 |
| 6,095,650 A * | 8/2000 | Gao et al. | 351/227 |
| 6,175,343 B1 * | 1/2001 | Mitchell et al. | 345/8 |
| 6,301,050 B1 * | 10/2001 | DeLeon | 359/618 |
| 6,538,623 B1 * | 3/2003 | Parnian et al. | 345/8 |
| 6,753,899 B2 * | 6/2004 | Lapalme et al. | 348/14.01 |
| 6,771,294 B1 * | 8/2004 | Pulli et al. | 715/863 |
| 7,245,273 B2 * | 7/2007 | Eberl et al. | 345/7 |
| 7,484,847 B2 * | 2/2009 | Fuziak, Jr. | 351/158 |
| 7,505,056 B2 * | 3/2009 | Kurzweil et al. | 345/698 |
| 7,605,719 B1 * | 10/2009 | Wenger et al. | 340/974 |
| 7,777,960 B2 * | 8/2010 | Freeman | 359/630 |
| 8,194,036 B1 * | 6/2012 | Braun et al. | 345/157 |
| 8,199,126 B1 * | 6/2012 | Taubman | 345/173 |
| 8,203,502 B1 * | 6/2012 | Chi et al. | 345/7 |
| 2002/0163486 A1 * | 11/2002 | Ronzani et al. | 345/87 |
| 2004/0095311 A1 * | 5/2004 | Tarlton et al. | 345/156 |
| 2004/0108981 A1 * | 6/2004 | El Sayed et al. | 345/80 |
| 2004/0119663 A1 * | 6/2004 | Wooten | 345/8 |
| 2004/0160571 A1 * | 8/2004 | Jannard et al. | 351/158 |
| 2005/0174429 A1 | 8/2005 | Yanai | |
| 2005/0174470 A1 * | 8/2005 | Yamasaki | 348/345 |
| 2006/0071877 A1 * | 4/2006 | Kanamori et al. | 345/7 |
| 2006/0121993 A1 * | 6/2006 | Scales et al. | 463/48 |
| 2006/0221266 A1 * | 10/2006 | Kato et al. | 348/838 |
| 2006/0251292 A1 * | 11/2006 | Gokturk et al. | 382/103 |
| 2007/0188522 A1 * | 8/2007 | Tsuyuki | 345/632 |
| 2008/0204361 A1 * | 8/2008 | Scales et al. | 345/8 |
| 2008/0211921 A1 | 9/2008 | Sako et al. | |
| 2008/0259199 A1 | 10/2008 | Sako et al. | |
| 2009/0040233 A1 * | 2/2009 | Yamamoto | 345/592 |
| 2010/0110368 A1 * | 5/2010 | Chaum | 351/158 |
| 2010/0149347 A1 * | 6/2010 | Kim et al. | 348/207.1 |
| 2010/0164990 A1 * | 7/2010 | Van Doorn | 345/633 |
| 2011/0053642 A1 * | 3/2011 | Lee | 455/556.1 |
| 2011/0164163 A1 * | 7/2011 | Bilbrey et al. | 348/333.01 |
| 2011/0214082 A1 * | 9/2011 | Osterhout et al. | 715/773 |
| 2012/0050142 A1 * | 3/2012 | Border et al. | 345/8 |
| 2013/0222215 A1 * | 8/2013 | Kobayashi | 345/8 |

FOREIGN PATENT DOCUMENTS

| | | |
|---|---|---|
| JP | 5 333891 | 12/1993 |
| JP | 8-5954 A | 1/1996 |
| JP | 8 126031 | 5/1996 |
| JP | 9 27970 | 1/1997 |
| JP | 9-81895 A | 3/1997 |
| JP | 9 101477 | 4/1997 |
| JP | 9-159747 A | 6/1997 |
| JP | 9 185009 | 7/1997 |
| JP | 2000-284742 A | 10/2000 |
| JP | 2000-347596 A | 12/2000 |
| JP | 2002 269593 | 9/2002 |
| JP | 2003 209722 | 7/2003 |
| JP | 2004-233908 | 8/2004 |
| JP | 2004 289340 | 10/2004 |
| JP | 2005 86328 | 3/2005 |
| JP | 2005 172851 | 6/2005 |
| JP | 2005 181378 | 7/2005 |
| JP | 2005 223524 | 8/2005 |
| WO | WO 99/49656 | 9/1999 |
| WO | WO 03/036553 A1 | 5/2003 |
| WO | WO 2004/099851 A2 | 11/2004 |
| WO | WO 2004/099851 A3 | 11/2004 |
| WO | 2005 122128 | 12/2005 |

OTHER PUBLICATIONS

Office Action issued Apr. 29, 2011, in Chinese Patent Application No. 200780032757.7 with English translation.
Supplementary European Search Report issued May 23, 2011, in European Patent Application No. 07792624.4.
Office Action issued Oct. 24, 2012 in European Patent Application No. 07 792 624.4.
Office Action issued Oct. 25, 2013, in Korean Patent Application No. 10-2009-7006207 (with English-language translation).
Korean Notice of Preliminary Rejection, with English translation, mailed on Mar. 28, 2014, in Patent Application No. 10-2009-7006207. 13 pages.
U.S. Appl. No. 14/172,521, filed Feb. 4, 2014, Sako, et al.
U.S. Appl. No. 13/564,439, filed Aug. 1, 2012, Sako, et al.
U.S. Appl. No. 13/567,547, filed Aug. 6, 2012, Sako, et al.

* cited by examiner

FIG. 2
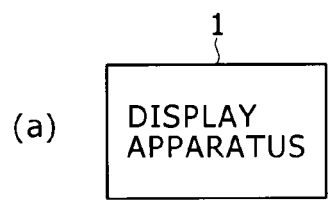
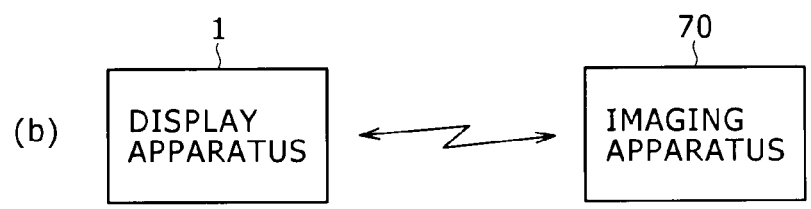
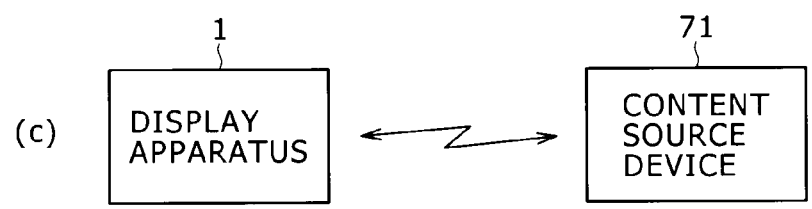
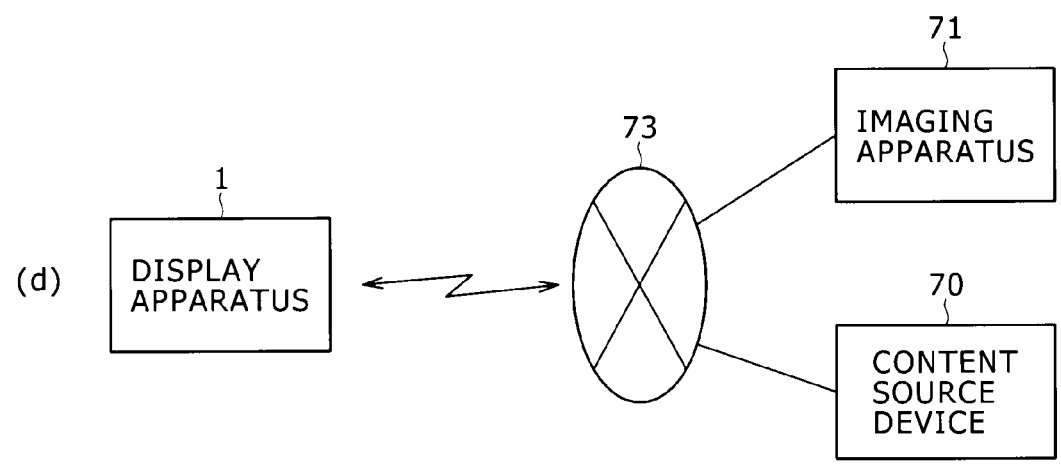

FIG. 5
(a) 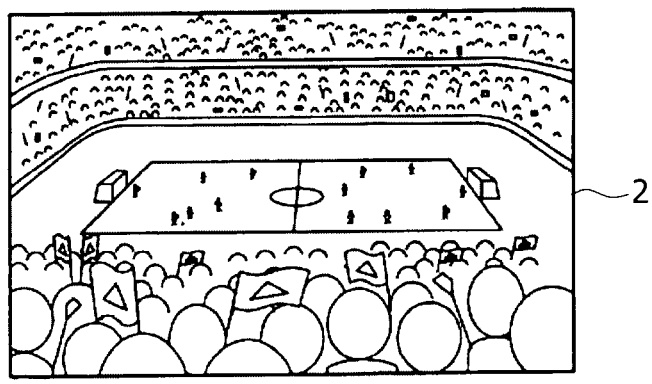
(b) 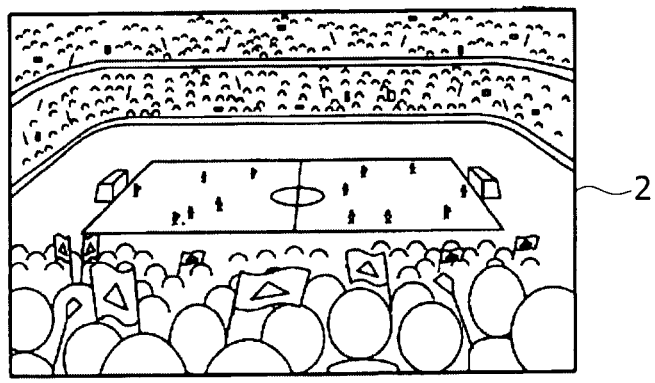
(c) 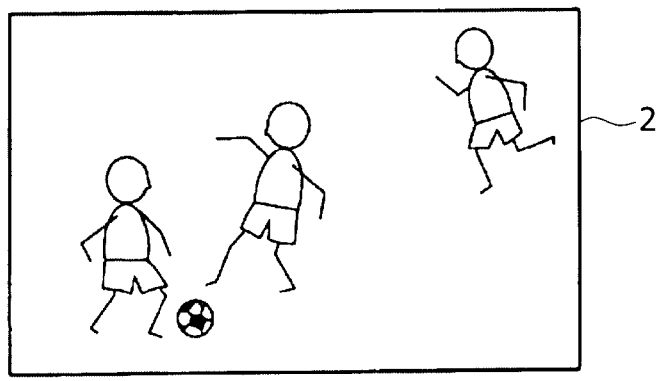

FIG. 6

(a) 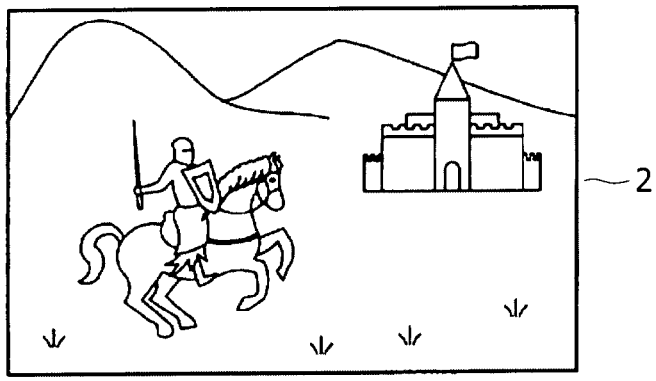

(b) 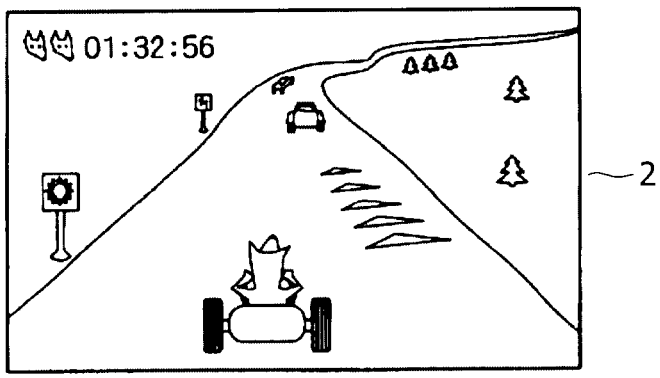

(c) IT IS ARRANGED TO PHOTOGRAPH A SUBJECT THAT THE USER WILL SEE WHEN THE USER WEARS IT, AND A PART CORRESPONDING TO BOTH TEMPORAL REGIONS AND AN OCCIPITAL REGION, FOR EXAMPLE, MAY BE IN A TRANSPARENT OR TRANSLUCENT STATE.
VIDEO CONTENT SUCH AS A VIDEO CLIP, A DIGITAL STILL CAMERA, A GAME IMAGE BASED ON A GAME PROGRAM, SPREADSHEET DATA, AND A SIGNAL CORRESPONDING TO A USER MOTION, FOR EXAMPLE, ARE OUTPUTTED. IT IS NOT THAT IT CANNOT DETERMINE A NECK MOTION, A MOTION OF THE WHOLE BODY, AN ARM MOTION, ALEG MOTION, A TENSE STATE, AN EXCITED STATE, A CALM STATE, A SLEEPY STATE, AND SO ON. CONTROL OF VOLUME AND SOUND QUALITY OF AUDIO, FOR EXAMPLE, MAY BE PERFORMED BASED ON BODY CONDITIONS. THE USER MAY OPEN AND CLOSE HIS EYELIDS THREE TIMES, OR WHEN STANDING UP, FOR EXAMPLE, THE USER'S NECK.....

FIG. 7
(a) 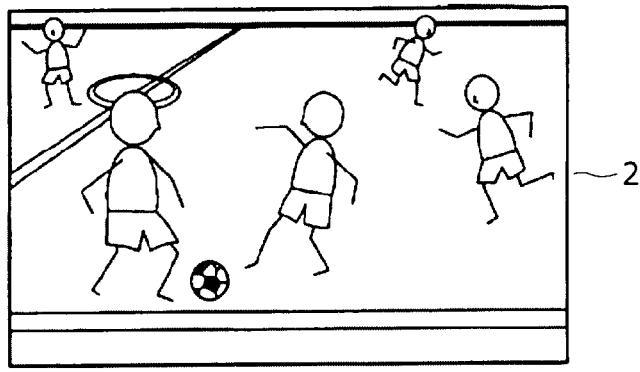
(b) 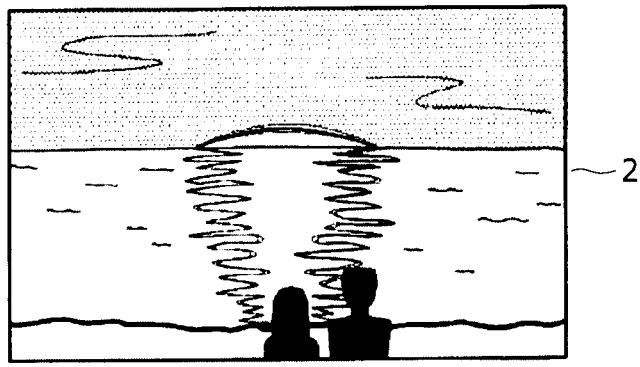
(c) 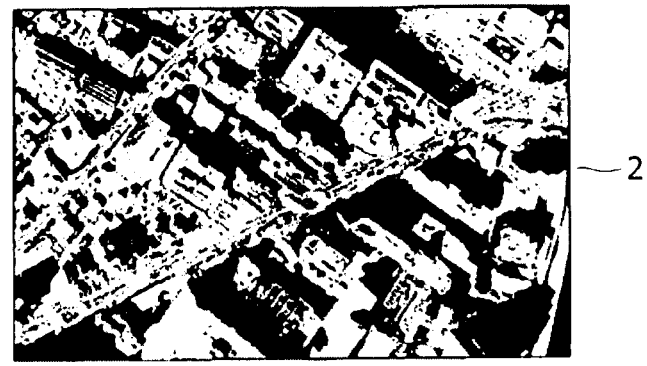

FIG. 8
(a) 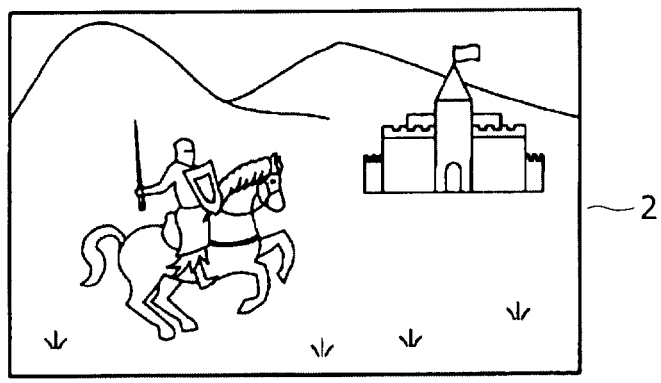
(b) 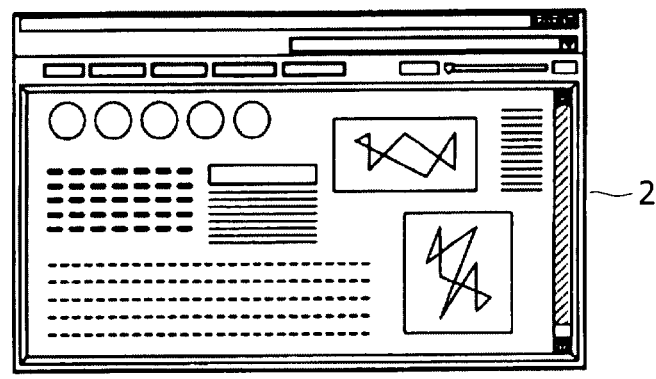
(c) 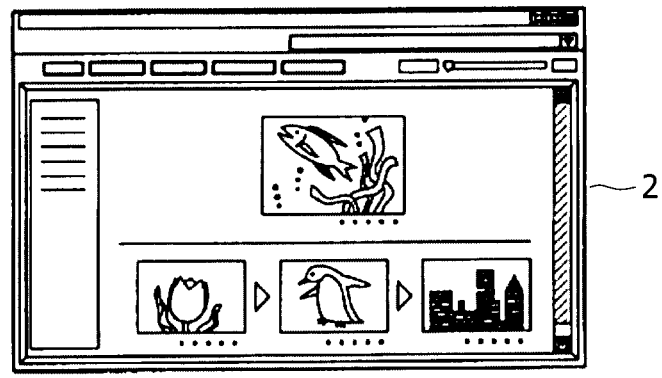

FIG. 9
(a) 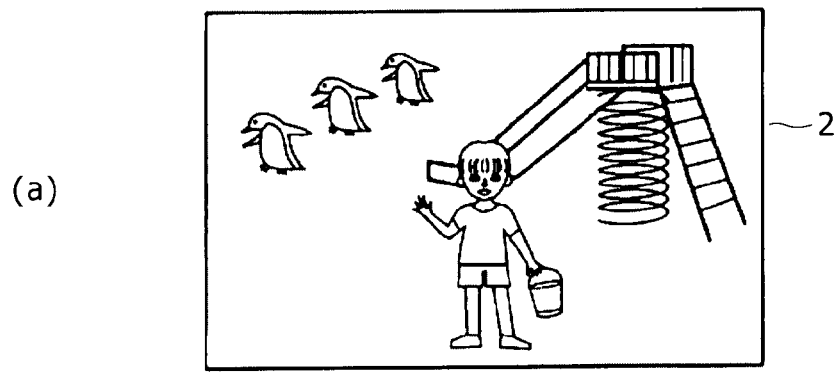
(b) 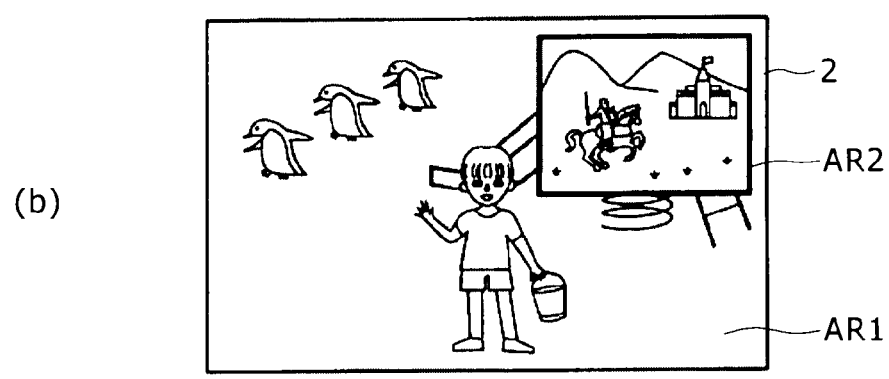
(c) 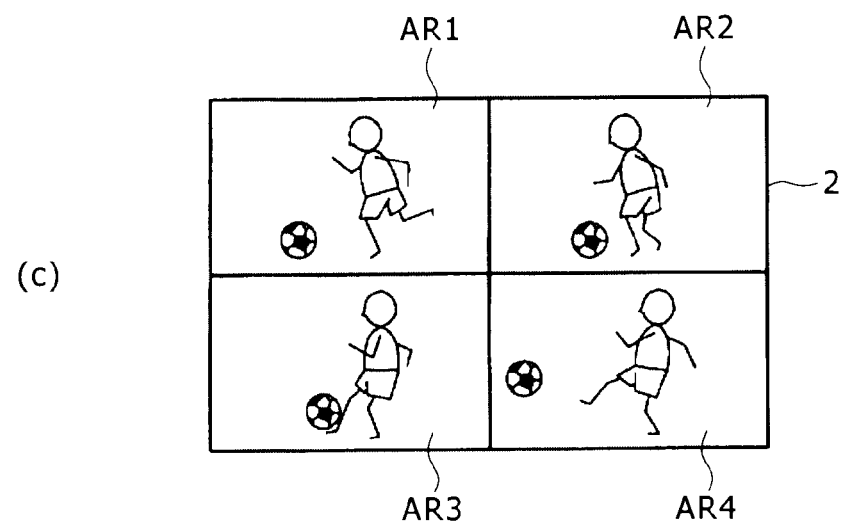

FIG.10
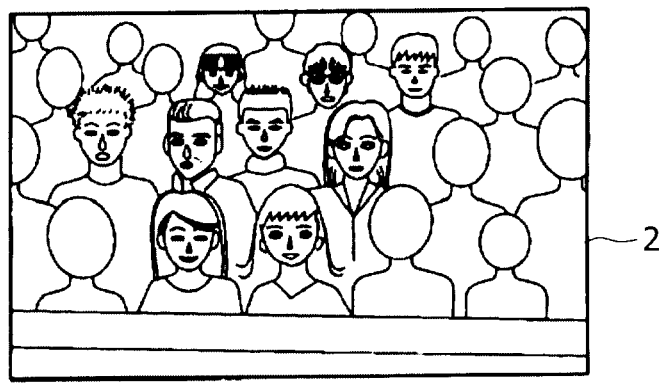
(a)
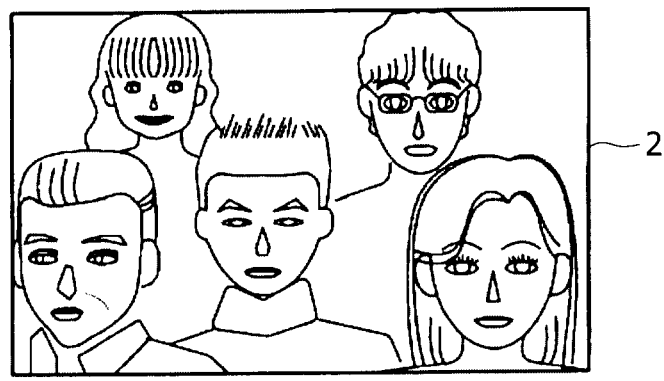
(b)

FIG.11
(a) 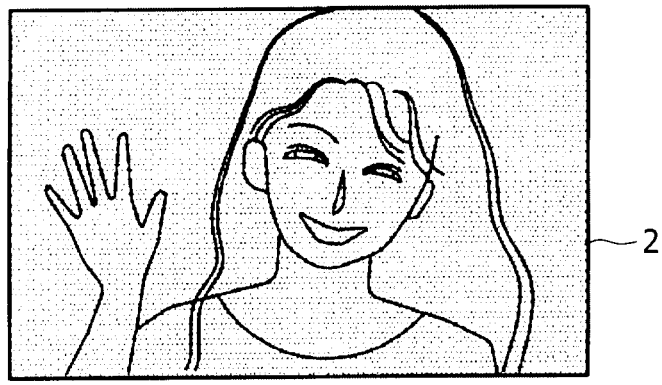
(b) 

FIG.12
(a) 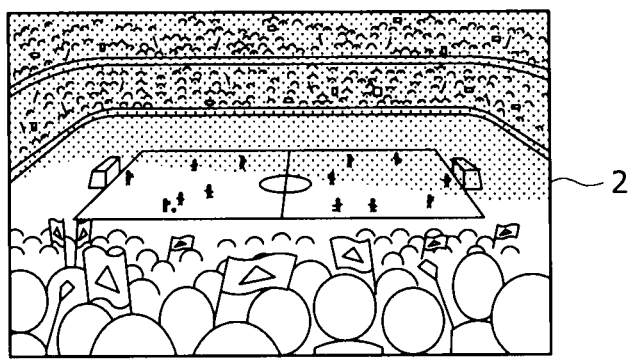
(b) 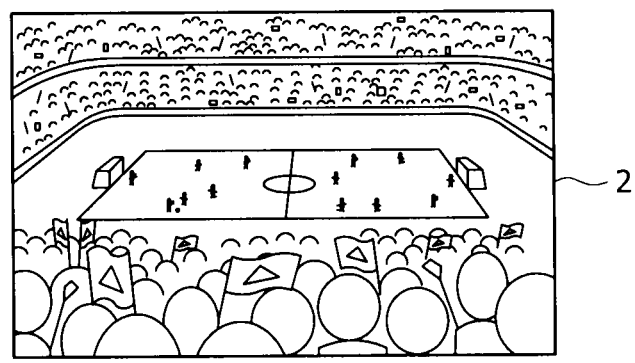
(c) 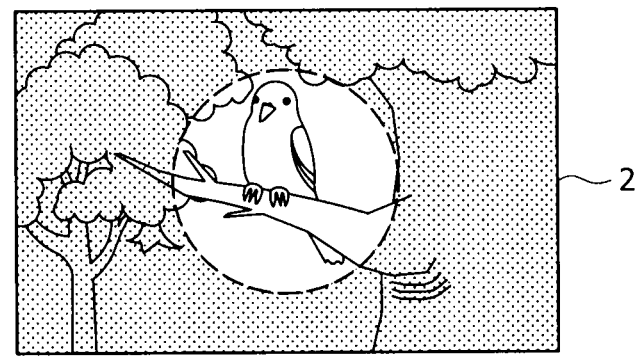

DISPLAY APPARATUS AND DISPLAY METHOD

TECHNICAL FIELD

The present invention relates to a display apparatus for displaying an image with display means arranged in front of an eye of a user while the display apparatus is mounted by the user using, for example, a wearing unit in the shape of spectacles or a wearing unit to be mounted on a head of the user. The present invention also relates to a display method.

BACKGROUND ART

As disclosed in Japanese Patent Laid-open Nos. Hei 8-126031, Hei 9-27970, and Hei 9-185009, various types of apparatuses for displaying an image with a display section arranged in front of an eye of a user by use of a spectacle-shaped or head-worn unit have already been proposed.

However, no known apparatuses are capable of performing a desirable display operation in accordance with the situation without the need for the user to operate an operation unit, such as an operation key.

Consequently, the object of the present invention is to enable an appropriate or entertaining display operation to be performed in accordance with an outside world situation (e.g., a surrounding environment, a date and time, a place, an input image, etc.).

DISCLOSURE OF INVENTION

A display apparatus of the present invention includes: display means to be arranged in front of an eye of a user for displaying an image; outside world information acquisition means for acquiring outside world information; and control means for controlling an operation of the display means based on the information acquired by the outside world information acquisition means.

Additionally, it further includes imaging means for photographing an image. Further, in this case, the control means controls the image data photographed by the imaging means to be displayed on the display means, based on the information acquired by the outside world information acquisition means.

Also, it further includes reproduction means for reproducing data from a storage medium. Further, in this case, the control means controls the data reproduced by the reproduction means to be displayed on the display means, based on the information acquired by the outside world information acquisition means.

Also, it further includes reception means for communicating with an external device to receive data. Further, in this case, the control means controls the data received by the reception means to be displayed on the display means, based on the information acquired by the outside world information acquisition means.

Also, the display means can switch between a transparent or translucent through state and a displaying state in which data supplied is displayed.

Also, the outside world information acquisition means is a sensor for detecting a situation of a surrounding environment as the outside world information.

Also, the outside world information acquisition means is a sensor for detecting information concerning an imaging object of the imaging means as the outside world information.

Also, the outside world information acquisition means acquires current position information as the outside world information.

Also, the outside world information acquisition means acquires a current date and time as the outside world information.

Also, the outside world information acquisition means acquires the outside world information via communication with an external device.

Also, the outside world information acquisition means acquires the outside world information via image analysis performed with respect to an image supplied to the display means.

Also, the outside world information acquired by the outside world information acquisition means is information of a brightness, temperature, humidity, atmospheric pressure, or weather of surroundings.

Also, the outside world information acquired by the outside world information acquisition means is information of a place corresponding to a current position.

Also, the outside world information acquired by the outside world information acquisition means is information of a structure or natural object in an area corresponding to a current position.

Also, the outside world information acquired by the outside world information acquisition means is information for identifying a specified object included in input image data.

Also, the outside world information acquired by the outside world information acquisition means is information for identifying a person, an animal, a structure, a natural object, or a device as a specified object included in input image data.

Also, the outside world information acquired by the outside world information acquisition means is information of a motion of an object included in input image data.

Also, the outside world information acquired by the outside world information acquisition means is information for identifying an individual person included in input image data.

Also, the outside world information acquired by the outside world information acquisition means is information for determining whether or not input image data includes a letter image.

Also, the outside world information acquired by the outside world information acquisition means is information of brightness or clearness of input image data.

Also, the outside world information acquired by the outside world information acquisition means is information of brightness or clearness of a part of an image of input image data.

Also, the control means controls start/termination of a display operation in the display means.

Also, the control means controls the display means to switch between the through state and the displaying state.

Also, the control means controls switching of a source from which data to be displayed on the display means is supplied.

Also, the control means controls magnification/reduction of the image displayed on the display means.

Also, the control means controls highlighting display of a part of a screen displayed on the display means.

Also, the control means controls split screen display performed in the display means.

Also, the control means controls display brightness in the display means.

Also, the control means controls signal processing performed on a signal of the image to be displayed by the display means.

Also, it further includes speech synthesis means for performing speech synthesis based on a letter included in the image to be supplied to the display means, and audio output means for outputting audio generated by the speech synthesis means.

A display method of the present invention includes, as a display method employed in a display apparatus including display means to be arranged in front of an eye of a user for displaying an image, an outside world information step for acquiring outside world information, and control step for exercising control related to a display operation performed in the display means based on the information acquired in the outside world information acquiring step.

In the present invention above, a user wears the display apparatus using, for example, a spectacle-shaped or head-worn unit or the like, so that the user can view the display means arranged in front of the eye. That is, while wearing the display apparatus, the user is able to view the image photographed by the imaging means, the image of the data reproduced by the reproduction means, the image of the data received by the reception means, or the like via the display means.

Here, it is preferable that control related to the display operation, such as On/Off/through control of the display operation, selection of the source of the image data to be displayed, control of various types of display operation modes (e.g., split screen display, magnification/reduction display, display image quality control such as control of the display brightness, highlighting of a part of the image, etc.), or switching of input to the display means, be performed in accordance with the situation. According to the present invention, various types of control are performed based on the outside world information, instead of by the user operating an operation unit.

According to the present invention, various images are displayed on the display means arranged in front of the eye of the user. At this time, control related to the display operation is performed based on the outside world information without the need for the user to perform any operation, so that an appropriate or entertaining display operation suited to the situation is performed. Thus, the display apparatus is convenient for the user, and is capable of providing a variety of scenes within his or her field of vision.

Moreover, since the display means is capable of entering a transparent or translucent through state, it is possible to prevent an interference from occurring in the user's daily life even while the user is wearing the display apparatus. Thus, advantages of the display apparatus according to the present invention can be enjoyed effectively in the user's daily life.

BRIEF DESCRIPTION OF DRAWINGS

FIG. 2 shows diagrams illustrating forms of usage of the display apparatus according to one embodiment.

FIG. 5 illustrates a through state and states in which photographed images are being displayed, according to one embodiment.

FIG. 6 illustrates each state in which an image obtained from a storage section according to one embodiment is being displayed.

FIG. 7 illustrates each state in which an image obtained from a communication section according to one embodiment is being displayed.

FIG. 8 illustrates each state in which an image obtained from a communication section according to one embodiment is being displayed.

FIG. 9 illustrates split screen display according to one embodiment.

FIG. 10 illustrates each state in which a magnified image is being displayed, according to one embodiment.

FIG. 11 illustrates each state in which a brightness-adjusted image is being displayed, according to one embodiment.

FIG. 12 shows views for illustrating image processing according to one embodiment.

BEST MODE FOR CARRYING OUT THE INVENTION

Hereinafter, display apparatuses and a display method according to embodiments of the present invention will be described in the following order.
[1. Exemplary appearance of display apparatus and relationships with external devices]
[2. Exemplary structures of display apparatus]
[3. Exemplary displays]
[4. Detection of outside world information]
[5. Various exemplary operations]
[6. Effects of embodiments, exemplary variants, and exemplary expansions]
[1. Exemplary Appearance of Display Apparatus and Relationships with External Devices]

Figure 1:
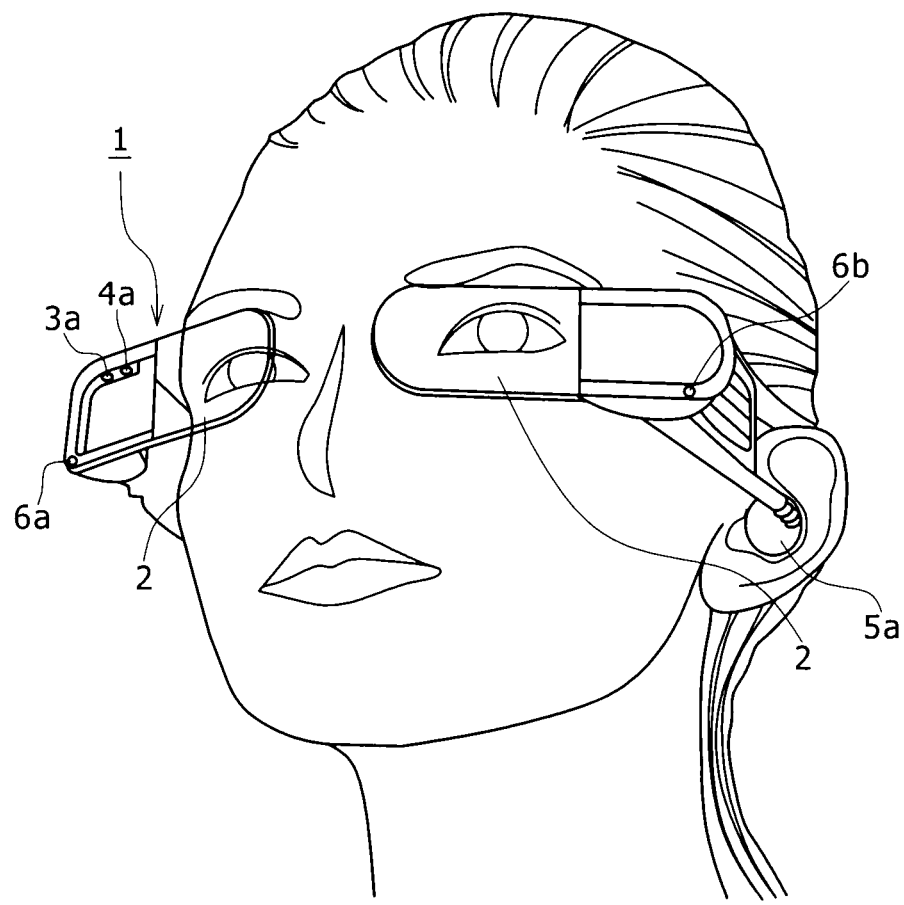
FIG. 1 is an illustration of an exemplary appearance of a display apparatus according to the present invention.

According to one embodiment, FIG. 1 shows an exemplary appearance of a display apparatus 1 formed as spectacle-shaped display. The display apparatus 1 has a wearing unit having a frame structure that extends halfway around a head from both temporal regions to an occipital region, for example, and is worn by a user with the wearing unit placed over ears as illustrated in this figure.

The display apparatus 1 has a pair of display sections 2, 2 designed for left and right eyes, and the display sections 2 are arranged in front of the eyes of the users, i.e., at positions where lenses of common spectacles would be located, when the display apparatus 1 is worn in a manner as illustrated in FIG. 1. Liquid crystal panels, for example, are used for the display sections 2, and the display sections 2 are capable of entering a through state, i.e., a transparent or translucent state, as illustrated in this figure by transmissivity control. The capability of the display sections 2 to enter the through state allows the user to wear at all times as he or she wears spectacles, with no interference occurring in his or her daily life.

In addition, a photographic lens 3a is arranged to face forward so as to photograph in a direction that the user will see as a direction for a subject when the user wears.

In addition, a lighting section 4a for providing illumination in a direction of photographing by the photographic lens 3a is provided. The lighting section 4a is formed by a light emitting diode (LED), for example.

In addition, a pair of earphone speakers 5a that can be inserted into right and left earholes of the user when the user wears is provided. Note that only the left earphone speaker 5a is shown in the figure.

In addition, microphones 6a and 6b for collecting external sounds is provided. They are arranged to the right of the right display section 2 for a right eye and to the left of the left display section 2 for a left eye, respectively.

Note that FIG. 1 only shows one example, and that various structures are possible for the user to wear the display apparatus 1. In general, a requirement for the wearing unit is that it be in the shape of spectacles or of a head-mount type. At least, a requirement in the present embodiment is that it allows the display sections 2 to be arranged in front of and close to the eyes of the user. Also note that, instead of having the pair of display sections 2 provided for both eyes, only one of the display sections 2 for one eye may be provided.

Also note that the earphone speakers 5a do not have to be the right and left speakers, but may have only one of the earphone speakers 5a to be inserted into only one earhole. Also note that the number of microphones may be only one of the microphones 6a and 6b.

Also note that, although FIG. 1 shows an example that an imaging function is included, an example without an imaging function is conceivable.

Also note that the display apparatus 1 need not have any microphone or earphone speaker. Also note that the configuration that the lighting section 4a is not provided is conceivable.

Meanwhile, exemplary internal structures of the display apparatus 1 will be described below. However, the display apparatus 1 may have a reproducing function (a storage section 25 described below with reference to FIGS. 3 and 4) of reproducing data from a storage medium, and a communication function (a communication section 26 described below with reference to FIGS. 3 and 4) of communicating with an external device.

Thus, conceivable sources of data of an image to be displayed on the display sections 2 include an imaging function portion, a reproducing function portion, and a communication function portion.

FIG. 2 shows exemplary modes of use of the display apparatus 1 in relation to external devices.

(a) of FIG. 2 shows a case in which the display apparatus 1 is used singly. In this case, if the display apparatus 1 has the imaging function, the display apparatus 1 is capable of displaying photographed image data on the display sections 2. Meanwhile, if the display apparatus 1 has the reproducing function, the display apparatus 1 is capable of displaying an image based on the data reproduced from the storage medium on the display sections 2. Examples of the data reproduced from the storage medium include a variety of data that can be stored in the storage medium to be displayed, such as: a video content such as a film or a video clip; a still image content photographed by a digital still camera or the like and stored in the storage medium; data of an electronic book or the like; computer use data such as image data, text data, or spreadsheet data created by the user using a personal computer or the like and stored in the storage medium; and a game image based on a game program stored in the storage medium.

(b) of FIG. 2 shows a case where the display apparatus 1 has the communication function and communicates with an external imaging apparatus 70. In this case, the display apparatus 1 receives an image (video or a still image) photographed by the imaging apparatus 70, and displays the received image on the display sections 2. Examples of the external imaging apparatus 70 include a video camera and a digital still camera having the communication function. In addition, the display apparatus 1 having the imaging function as illustrated in FIG. 1 can be conceived as the external imaging apparatus 70 for a certain display apparatus 1.

Moreover, various types of external imaging apparatuses 70 are conceivable. For example, it may be an imaging apparatus possessed by the user who uses the display apparatus 1, an imaging apparatus possessed by an acquaintance of the user of the display apparatus 1, or an imaging apparatus possessed by a public institution, a service company, or the like that provides images and which is capable of communicating with the display apparatus 1.

(c) of FIG. 2 shows a case where the display apparatus 1 has the communication function and communicates with an external content source device 71. In this case, the display apparatus 1 receives an image (video or a still image) provided from the content source device 71, and displays the received image on the display sections 2.

Examples of the content source device 71 include: AV (audio-visual) equipment such as video equipment, a television tuner, or a home server; and information processing apparatuses such as the personal computer, a PDA (personal digital assistant), or a mobile phone. Similarly, various types of content source devices 71 are conceivable, such as: a device possessed by the user who uses the display apparatus 1, a device possessed by an acquaintance of the user who uses the display apparatus 1, or a server device of a public institution, a service company, or the like that provides various contents.

Examples of data transmitted from the content source device 71 to the display apparatus 1 include a variety of data that can be displayed, such as: the video content such as the film or the video clip; the still image content photographed by the digital still camera or the like and stored in the storage medium; the data of the electronic book or the like; the computer-readable data such as the image data, the text data, or the spreadsheet data created by the user using the personal computer or the like; and the game image.

(d) of FIG. 2 shows a case where the display apparatus 1 has the communication function, in particular, a function of accessing a network 73 such as the Internet, and thereby communicates with the external imaging apparatus 70 or the content source device 71 connected to the display apparatus 1 via the network 73. In this case, the display apparatus 1 receives various data via the network 73, and displays an image of the received data on the display sections 2.

[2. Exemplary Structures of Display Apparatus]

Figure 3:
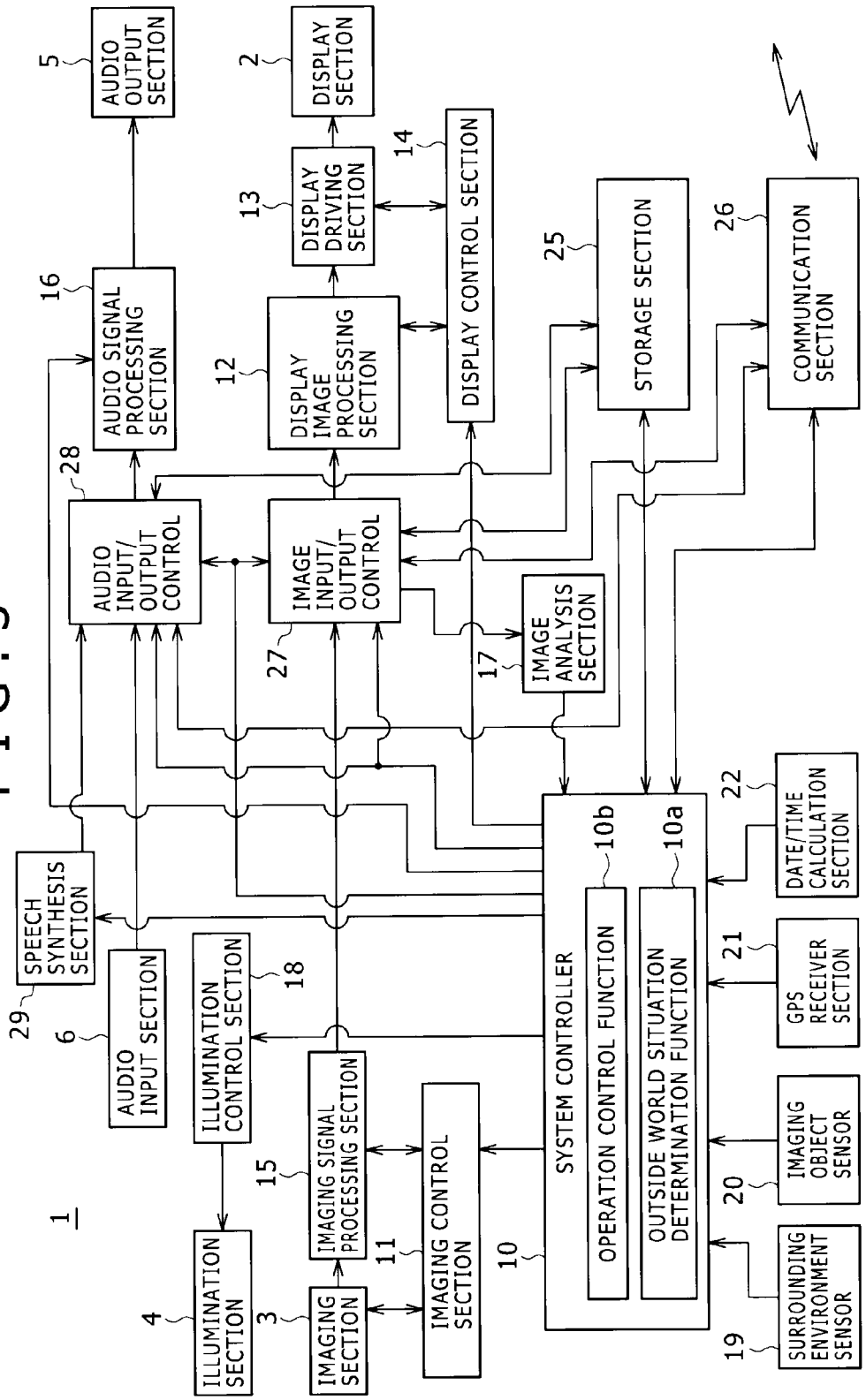
FIG. 3 is a block diagram illustrating an exemplary structure of a display apparatus according to one embodiment.

FIG. 3 shows an exemplary internal structure of the display apparatus 1.

A system controller 10 is formed by a microcomputer that includes a CPU (central processing unit), a ROM (read only memory), a RAM (random access memory), a nonvolatile memory section, and an interface section, for example, and controls an overall operation of the display apparatus 1.

Based on an outside world situation, the system controller 10 controls each part of the display apparatus 1. That is, the system controller 10 operates in accordance with an operating program for detecting and determining the outside world situation and controlling an operation of each part of the display apparatus 1 in accordance with the detected and determined outside world situation. Therefore, from the viewpoint of functions, the display apparatus 1 has, as shown in the figure, an outside world situation determination function 10a of determining the outside world situation, and an operation control function 10b of issuing a control instruction to each part of the display apparatus 1 in accordance with the outside world situation determined by the outside world situation determination function 10a.

The display apparatus 1 includes, as units for photographing a scene ahead of the user, an imaging section 3, an imaging control section 11, and an imaging signal processing section 15.

The imaging section 3 includes: a lens system formed by the photographic lens 3a illustrated in FIG. 1, a diaphragm, a zoom lens, a focus lens, and the like; a driving system for allowing the lens system to perform a focusing operation, a zooming operation, and the like; and a solid-state imaging device array for detecting light for imaging obtained by the lens system, and subjecting the detected light to optical-to-electrical conversion to generate an imaging signal. The solid-state imaging device array is, for example, a CCD (charge coupled device) sensor array or a CMOS (complementary metal oxide semiconductor) sensor array.

The imaging signal processing section 15 includes a sample-hold/AGC (automatic gain control) circuit for subjecting the signal obtained by the solid-state imaging device in the imaging section 3 to gain control and waveform shaping, and a video A/D converter, and obtains an imaging signal in digital form. In addition, the imaging signal processing section 15 performs white balancing processing, brightness processing, color signal processing, blur correction processing, and the like on the imaging signal.

Based on the instruction issued from the system controller 10, the imaging control section 11 controls operations of the imaging section 3 and the imaging signal processing section 15. For example, the imaging control section 11 controls activation and deactivation of the operations of the imaging section 3 and the imaging signal processing section 15. In addition, the imaging control section 11 exercises control (motor control) for allowing the imaging section 3 to perform operations such as autofocusing, automatic exposure adjustment, aperture adjustment, and zooming.

The imaging control section 11 includes a timing generator, and uses a timing signal generated by the timing generator to control signal processing operations performed by the solid-state imaging device, and the sample-hold/AGC circuit and the video A/D converter in the imaging signal processing section 15. Moreover, this timing control enables variable control of an imaging frame rate.

In addition, the imaging control section 11 controls imaging sensitivity and signal processing in the solid-state imaging device and the imaging signal processing section 15. For example, as control of the imaging sensitivity, the imaging control section 11 is capable of performing the gain control on the signal read from the solid-state imaging device, and black level setting, control of various coefficients in processing the imaging signal in digital form, control of a correction value in the blur correction processing, and the like. Regarding the control of the imaging sensitivity, overall sensitivity adjustment with no regard to any particular wavelength range, and sensitivity adjustment of adjusting imaging sensitivity of a particular wavelength range such as an infrared range or an ultraviolet range (for example, imaging that involves cutting off the particular wavelength range) are possible, for example. Sensitivity adjustment in accordance with the wavelength is achieved by insertion of a wavelength filter in a photographic lens system or a wavelength filter operation process performed on the imaging signal. In these cases, the imaging control section 11 achieves the sensitivity control by controlling the insertion of the wavelength filter, specification of a filter operation coefficient, or the like.

The imaging signal (i.e., the photographed image data) obtained by imaging by the imaging section 3 and processing by the imaging signal processing section 15 is supplied to an image input/output control section 27.

Under control of the system controller 10, the image input/output control section 27 controls transfer of the image data. Specifically, the image input/output control section 27 controls transfer of the image data among an imaging system (i.e., the imaging signal processing section 15), a display system (i.e., a display image processing section 12), the storage section 25, and the communication section 26.

For example, the image input/output control section 27 performs an operation of supplying the imaging signal (i.e., the image data) processed by the imaging signal processing section 15 to the display image processing section 12, the storage section 25, or the communication section 26.

Also, the image input/output control section 27 performs an operation of supplying the image data reproduced from the storage section 25 to the display image processing section 12 or the communication section 26, for example.

Also, the image input/output control section 27 performs an operation of supplying the image data received via the communication section 26 to the display image processing section 12 or the storage section 25, for example.

The display apparatus 1 includes, as units for presenting a display to the user, the display section 2, the display image processing section 12, a display driving section 13, and a display control section 14.

For example, the image data as the imaging signal obtained by imaging by the imaging section 3 and processing by the imaging signal processing section 15 can be supplied to the display image processing section 12 via the image input/output control section 27. The display image processing section 12 is, for example, a so-called video processor, and is capable of performing various display processes on the supplied image data. For example, the display image processing section is capable of performing brightness level control, color correction, contrast control, sharpness (edge enhancement) control, and the like on the image data. In addition, the display image processing section 12 is also capable of: generation of a magnified image in which a part of the supplied image data is magnified; generation of a reduced image; division or combination of an image(s) for split screen display of the supplied image data; image processing for highlighting (emphasizing) displaying a part of an image displayed; generation of a character image or a conceptual image; combination of a generated image with the supplied image data; and the like. In short, the display image processing section 12 is capable of performing various processes on the supplied image data.

The display driving section 13 is formed by a pixel driving circuit for allowing the image data supplied from the display image processing section 12 to be displayed on the display section (e.g., a liquid crystal display) 2. That is, the display driving section 13 applies driving signals based on a video signal to pixels arranged in a matrix in the display section 2 with specified horizontal/vertical driving timing for displaying. In addition, the display driving section 13 is capable of controlling transmissivity of each of the pixels in the display section 2 to cause the display section 2 to enter the through state.

Based on the instruction issued from the system controller 10, the display control section 14 controls a processing operation of the display image processing section 12 and an operation of the display driving section 13. Specifically, the display control section 14 controls the display image processing section 12 to perform the aforementioned various processes. Also, the display control section 14 controls the display driving section 13 to switch between the through state and an image displaying state.

The image data reproduced in the storage section 25 and the image data received via the communication section 26 can also be supplied to the display image processing section 12 via the image input/output control section 27. In this case, a reproduced image or a received image is outputted via the display section 2 by the above-described operations of the display image processing section 12 and the display driving section 13.

The display apparatus 1 further includes an audio input section 6, an audio signal processing section 16, and an audio output section 5.

The audio input section 6 includes the microphones 6a and 6b illustrated in FIG. 1, a microphone amplifier section for amplifying audio signals obtained by the microphones 6a and 6b, and an A/D converter, and outputs audio data.

The audio data obtained by the audio input section 6 is supplied to an audio input/output control section 28.

Under control of the system controller 10, the audio input/output control section 28 controls transfer of the audio data. Specifically, the audio input/output control section 28 controls transfer of the audio signal among the audio input section 6, the audio signal processing section 16, the storage section 25, and the communication section 26.

For example, the audio input/output control section 28 performs an operation of supplying the audio data obtained by the audio input section 6 to the audio signal processing section 16, the storage section 25, or the communication section 26.

Also, the audio input/output control section 28 performs an operation of supplying audio data reproduced in the storage section 25 to the audio signal processing section 16 or the communication section 26, for example.

Also, the audio input/output control section 28 performs an operation of supplying audio data received via the communication section 26 to the audio signal processing section 16 or the storage section 25, for example.

The audio signal processing section 16 is formed by a digital signal processor, a D/A converter, and the like, for example. The audio data obtained by the audio input section 6, the audio data reproduced in the storage section 25, or the audio data received via the communication section 26 is supplied to the audio signal processing section 16 via the audio input/output control section 28. Under control of the system controller 10, the audio signal processing section 16 performs a process such as volume control, tone control, or application of a sound effect on the supplied audio data. Then, the audio signal processing section 16 converts the processed audio data into an analog signal, and supplies the analog signal to the audio output section 5. Note that the audio signal processing section 16 is not limited to a unit that performs digital signal processing, but may be a unit that performs signal processing using an analog amplifier, an analog filter, or the like.

The audio output section 5 includes the pair of earphone speakers 5a illustrated in FIG. 1 and an amplifier circuit for the earphone speakers 5a.

The audio input section 6, the audio signal processing section 16, and the audio output section 5 enable the user to listen to an external sound, audio reproduced in the storage section 25, or audio received via the communication section 26. Note that the audio output section 5 may be formed by a so-called bone conduction speaker.

The storage section 25 is a section for recording data on or reproducing data from a predetermined storage medium. For example, the storage section 25 is formed by a hard disk drive (HDD). Needless to say, as this storage medium, various types of storage media are adoptable such as: a solid-state memory such as a flash memory, a memory card containing a fixed memory, an optical disk, a magneto-optical disk, and a hologram memory. A requirement for the storage section 25 is to be capable of recording and reproducing the data in accordance with the adopted storage medium.

The image data as the imaging signal obtained by imaging by the imaging section 3 and processing by the imaging signal processing section 15 and the image data received via the communication section 26 can be supplied to the storage section 25 via the image input/output control section 27. In addition, the audio data obtained by the audio input section 6 and the audio data received via the communication section 26 can be supplied to the storage section 25 via the audio input/output control section 28.

Under control of the system controller 10, the storage section 25 encodes the supplied image or audio data for the data to be recorded on the storage medium, and records the encoded data on the storage medium.

In addition, under control of the system controller 10, the storage section 25 reproduces the image or audio data from the storage medium. The image data reproduced is outputted to the image input/output control section 27, whereas the audio data reproduced is outputted to the audio input/output control section 28.

The communication section 26 transmits and receives data to and from the external device. As the external device, various devices as the imaging apparatus 70 or the content source device 71 as described above with reference to FIG. 2, or the like are conceivable.

The communication section 26 may be configured to perform network communication via short-range wireless communication for a network access point, for example, in accordance with a system such as a wireless LAN, Bluetooth, or the like. Alternatively, the communication section 26 may perform wireless communication directly with an external device having a corresponding communication function.

The image data as the imaging signal obtained by imaging by the imaging section 3 and processing by the imaging signal processing section 15 and the image data reproduced in the storage section 25 can be supplied to the communication section 26 via the image input/output control section 27. In addition, the audio data obtained by the audio input section 6 and the audio data reproduced in the storage section 25 can be supplied to the communication section 26 via the audio input/output control section 28.

Under control of the system controller 10, the communication section 26 subjects the supplied image or audio data to encoding, modulation, and the like for transmission, and transmits the resulting data to the external device.

The communication section 26 also performs an operation of receiving data from the external device. Image data received and demodulated is outputted to the image input/output control section 27, whereas audio data received and demodulated is outputted to the audio input/output control section 28.

The display apparatus 1 further includes a speech synthesis section 29. In accordance with the instruction issued from the system controller 10, the speech synthesis section 29 performs speech synthesis to output an audio signal.

The audio signal outputted from the speech synthesis section 29 is supplied to the audio signal processing section 16 via the audio input/output control section 28 and processed in the audio signal processing section 16, and the resulting audio signal is supplied to the audio output section 5 to be outputted to the user as sound.

The speech synthesis section 29 generates an audio signal for a read speech described below, for example.

The display apparatus 1 further includes an illumination section 4 and an illumination control section 18. The illumination section 4 is formed by the lighting section 4a illustrated in FIG. 1 and a lighting circuit for allowing the lighting section 4a (e.g., the LED) to emit light. Based on the instruction issued from the system controller 10, the illumination control section 18 causes the illumination section 4 to perform a lighting operation.

Because the lighting section 4a in the illumination section 4 is arranged to illuminate a scene ahead of the user as illustrated in FIG. 1, the illumination section 4 performs an operation of providing illumination in a direction in which the user sees.

The display apparatus 1 includes, as units for acquiring outside world information, a surrounding environment sensor 19, an imaging object sensor 20, a GPS receiver section 21, a date/time calculation section 22, an image analysis section 17, and the communication section 26.

Specific examples of the surrounding environment sensor 19 include an illumination sensor, a temperature sensor, a humidity sensor, and an atmospheric pressure sensor. The surrounding environment sensor 19 is a sensor for obtaining information for detecting the brightness, temperature, humidity, weather, or the like of surroundings, as the surrounding environment of the display apparatus 1.

The imaging object sensor 20 is a sensor for detecting information concerning an imaging object, i.e., a subject of an imaging operation in the imaging section 3. Examples of the imaging object sensor 20 include: a distance-measuring sensor for detecting information on a distance from the display apparatus 1 to the imaging object; and a sensor (e.g., an infrared sensor such as a pyroelectric sensor) for detecting information or energy of, for example, a particular wavelength in infrared rays emitted by the imaging object. In the case of the pyroelectric sensor, it is possible to detect whether or not the imaging object is a living body such as a human being or an animal.

Further, a sensor (e.g., various types of UV (ultra violet) sensors) for detecting information or energy of, for example, a particular wavelength in ultraviolet rays emitted by the imaging object can also be supposed. In this case, it is possible, for example, to detect whether or not the imaging object is a fluorescent substance or a fluorescent body, and to detect the amount of ultraviolet rays in the outside world, which is necessary for sunburn prevention.

The GPS receiver section 21 receives a radio wave from a GPS (global positioning system) satellite, and outputs information on the latitude and longitude of the current position.

The date/time calculation section 22 serves as a so-called clock section to calculate the date and time (year, month, day, hour, minute, second), and outputs information on the current date and time.

The image analysis section 17 subjects the image data to image analysis. The image data is supplied to the image analysis section 17 via the image input/output control section 27. Examples of the image data subjected to image analysis in the image analysis section 17 include: the image data of a photographed image obtained by the imaging section 3 and the imaging signal processing section 15; the image data received via the communication section 26; and the image data reproduced from the storage medium in the storage section 25. In other words, any image data inputted to the display apparatus 1 to be displayed on the display section 2 can be subjected to image analysis in the image analysis section 17. Then, the image analysis section 17 analyzes the image data to obtain information on the image included in the image data.

The communication section 26 performs data communication with the external device. Examples of the external device include various devices having information processing and communication functions, such as a computer device, a personal digital assistant (PDA), a mobile phone, video equipment, an audio system, and a tuner device.

In addition, other examples include a terminal device and a server device connected to the network such as the Internet.

Further, other examples include a contactless IC card that contains an IC chip, a two-dimensional bar code such as a QR Code, and a hologram memory. In these cases, the communication section 26 reads information from these external devices.

Further, another display apparatus 1 is also conceivable as the external device.

The communication section 26 may be configured to perform network communication via short-range wireless communication for the network access point, for example, in accordance with a system such as the wireless LAN, the Bluetooth, or the like. Alternatively, the communication section 26 may perform wireless communication directly with the external device having the corresponding communication function.

Information concerning the outside world for the display apparatus 1 is acquired by the surrounding environment sensor 19, the imaging object sensor 20, the GPS receiver section 21, the date/time calculation section 22, the image analysis section 17, and the communication section 26, and the acquired information is supplied to the system controller 10.

In accordance with the outside world information acquired via processing of the outside world situation determination function 10a, the system controller 10 exercises control related to the imaging operation or a display operation via processing of the operation control function 10b. Specifically, the system controller 10 instructs the display control section 14 to control the operations of the display image processing section 12 and the display driving section 13, selects the source of the data to be displayed, controls a reproducing operation of the storage section 25, or controls a communication operation of the communication section 26.

Note that although the surrounding environment sensor 19, the imaging object sensor 20, the GPS receiver section 21, the date/time calculation section 22, the image analysis section 17, and the communication section 26 have been described above as the units for acquiring the outside world information, it is not necessary that all of these units are included. Also note that another sensor, such as an audio analysis section for detecting and analyzing surrounding sound may be included.

Figure 4:
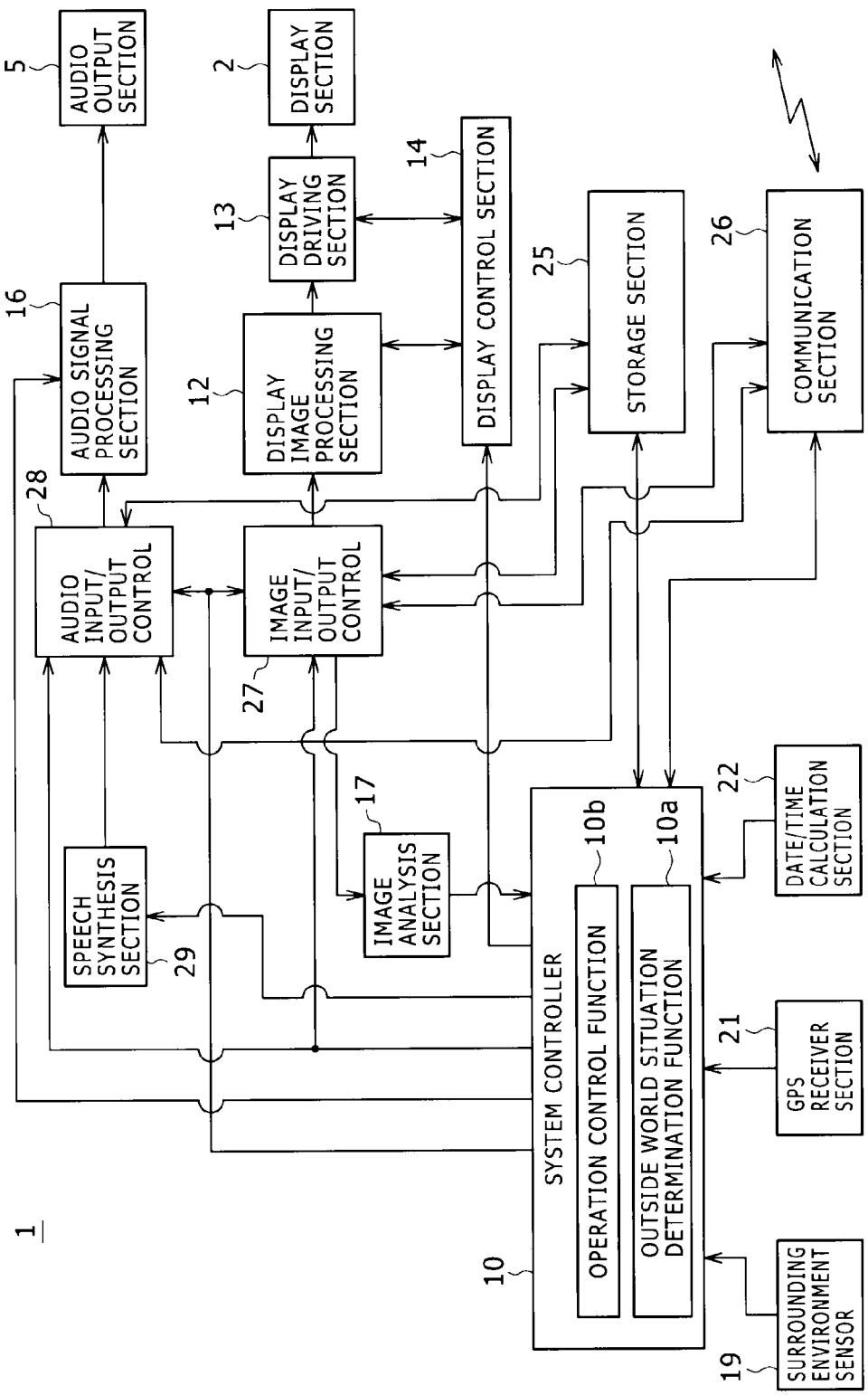
FIG. 4 is a block diagram illustrating another exemplary structure of a display apparatus according to one embodiment.

FIG. 4 shows an exemplary structure of a display apparatus 1 that does not have the imaging function. Note that, in FIG. 4, blocks having corresponding blocks in FIG. 3 are assigned the same reference numerals as in FIG. 3, and redundant description is avoided.

The structure of FIG. 4 is different from the structure of FIG. 3 in that the imaging section 3, the imaging signal processing section 15, the imaging control section 11, the illumination section 4, the illumination control section 18, the audio input section 6, and the imaging object sensor 20 are omitted.

In the case of the exemplary structure of FIG. 3 described above, there are three possible sources of the data to be displayed on the display section 2: an imaging function system (i.e., the imaging section 3, the imaging signal processing section 15, and the imaging control section 11), a reproducing function system (i.e., the storage section 25), and a receiving function system (i.e., the communication section 26). Meanwhile, in the case of the exemplary structure of FIG. 4, there are two possible sources of the data to be displayed on the display section 2: the reproducing function system (i.e., the storage section 25) and the receiving function system (i.e., the communication section 26).

In other words, FIG. 3 corresponds to the case where the display apparatus 1 contains three types of sources of display images, whereas FIG. 4 corresponds to the case where the display apparatus 1 contains two types of sources of the display images.

In the latter case, the image data to be subjected to image analysis in the image analysis section 17 is the image data received via the communication section 26 or the image data reproduced from the storage medium in the storage section 25.

Although not shown in the figures, there are other possible structures of the display apparatus 1 than those illustrated in FIGS. 3 and 4. For example, as the source(s) of the display images within the display apparatus 1, the display apparatus 1 may have only the imaging function system, only the reproducing function system, only the receiving function system, the imaging function system and the reproducing function system, or the imaging function system and the receiving function system.

[3. Exemplary Displays]

As a result of the system controller 10 exercising control related to the display operation in accordance with the acquired outside world information to, for example, selecting the source of the data to be displayed or processing the display image, the user is able to view various images in various display modes displayed on the display section 2. Various exemplary displays will now be described below with reference to FIGS. 5 to 12.

(a) of FIG. 5 illustrates a case where the display section 2 is in the through state. At this time, the display section 2 is in a state of being simply a transparent plate, and the user is able to view a scene within his or her field of vision through the transparent display section 2.

(b) of FIG. 5 illustrates a state in which the image photographed by the imaging section 3 is being displayed on the display section 2. The display section 2 will enter this state if, when the display section 2 is in the state as illustrated in (a) of FIG. 5, the imaging section 3, the imaging signal processing section 15, the display image processing section 12, and the display driving section 13 operate to display the photographed image on the display section 2 in a regular manner, for example. The photographed image (i.e., a regular photographed image) displayed on the display section 2 in this case is nearly the same as a scene the user would view through the display section 2 in the through state. That is, in this state, the user views a photographed image that represents a regular scene within his or her field of vision.

(c) of FIG. 5 illustrates a case where the system controller 10 has controlled the imaging control section to control the imaging section 3 to take a telephoto, and a telephoto image is being displayed on the display section 2.

Although not shown in the figures, if the system controller 10 controls the imaging control section 11 to control the imaging section 3 to take a wide-angle photograph, a wide-angle image of a scene nearby will be displayed on the display section 2. Note that telephoto/wide-angle control can be achieved by drive control of the zoom lens in the imaging section 3 as well as by signal processing in the imaging signal processing section 15.

While (b) and (c) of FIG. 5 illustrate exemplary cases where the source of the image displayed on the display section 2 is the imaging function system, FIG. 6 illustrates exemplary cases where the source of the image displayed on the display section 2 is the storage section 25.

(a) of FIG. 6 illustrates an exemplary case where an image content such as the video or the still image is stored in the storage medium in the storage section 25, and the image content reproduced therefrom is being displayed on the display section 2.

(b) of FIG. 6 illustrates an exemplary case where the game program is stored in the storage medium in the storage section 25, and the image based on the game program is being displayed on the display section 2.

(c) of FIG. 6 illustrates an exemplary case where an electronic book content is stored in the storage medium in the storage section 25, and the electronic book content reproduced therefrom is being displayed on the display section 2.

As illustrated in (a), (b), and (c) of FIG. 6, the user is able to use the display apparatus 1 to enjoy the reproduced image of the data stored in the storage medium.

Next, FIG. 7 and FIG. 8 illustrate exemplary cases where the source of the image displayed on the display section 2 is the communication section 26.

FIG. 7 illustrates exemplary cases where images transmitted from the external imaging apparatus 70 and received by the communication section 26 via communication as illustrated in (b) of FIG. 2 or (d) of FIG. 2 are being displayed.

(a) of FIG. 7 illustrates an exemplary case where, when the user is viewing the scene as illustrated in (a) of FIG. 5, i.e., when the user is in a seat in a stadium and is watching a soccer game, for example, video photographed by an imaging apparatus 70 placed at a different place in the stadium is received by the communication section 26 and is being displayed on the display section 2. For example, the imaging apparatus 70 may be placed near a seat for a team coach, or a small-sized imaging apparatus 70 may be worn by a referee. In such a case, if video transmitted from such an imaging apparatus 70 is received and is displayed on the display section 2, the user is able to enjoy watching the game more fully.

(b) of FIG. 7 illustrates an exemplary case where video photographed by an imaging apparatus 70 placed at a resort or an imaging apparatus 70 carried by an acquaintance who is traveling has been received by the communication section 26 and is being displayed on the display section 2. As a result of such video being displayed on the display section 2, the user, being at home, for example, is able to enjoy watching video photographed in various areas.

(c) of FIG. 7 illustrates an exemplary case where ground video (bird's-eye view video) photographed by an imaging apparatus 70 mounted on an airplane or a satellite has been received by the communication section 26 and is being displayed on the display section 2. As a result of such video being displayed on the display section 2, the user is able to enjoy watching a scene that normally cannot be viewed.

FIG. 8 illustrates exemplary cases where images transmitted from the external content source device 71 and received by the communication section 26 via communication as illustrated in (c) of FIG. 2 or (d) of FIG. 2 are being displayed.

(a) of FIG. 8 illustrates an exemplary case where an image content such as video or a still image has been received from the content source device 71 such as AV equipment, a personal computer, or the like, and the received image content is being displayed on the display section 2.

(b) of FIG. 8 illustrates an exemplary case where the content source device 71 such as the personal computer or the like has transmitted image data of a browser screen of a web site being accessed or a screen of a running application to the display apparatus 1, for example, and the display apparatus 1 has received the transmitted image data via the communication section 26 and is displaying the received image data on the display section 2.

(c) of FIG. 8 illustrates an exemplary case where the content source device 71 such as the personal computer or the like has transmitted an image of a list of photograph images that can be viewed in the content source device 71 to the display apparatus 1, for example, and the display apparatus 1 has received the transmitted image via the communication section 26 and is displaying the received image on the display section 2.

As described above, the display apparatus 1 can receive, as the image obtained from the content source device 71, the data from the AV equipment such as a video player or the information processing apparatus such as the personal computer, and display the image, for example. Thus, the user is able to check the image or perform various operations using the display apparatus 1 which he or she wears.

The source of the images illustrated in FIG. 6 and the source of the images illustrated in FIG. 8 have been assumed to be the storage section 25 and the communication section 26, respectively. Note, however, that the images illustrated in FIG. 8 can also be conceived as images reproduced from the storage section 25, and that the images illustrated in FIG. 6 can also be conceived as images transmitted from the external device and received by the communication section 26, for example.

With reference to FIGS. 9 to 12, processes performed on the images obtained from the above-described various sources (i.e., the imaging function system, the reproducing function system, and the receiving function system) and which are related to the display modes and the image data will now be described below.

(a) of FIG. 9 illustrates a case where the display section 2 is in the through state.

The system controller 10 is capable of instructing the display control section 14 (the display image processing section 12 and the display driving section 13) to present a split screen display to display an image as illustrated in (b) of FIG. 9 on the display section 2. That is, it is an exemplary case where a screen of the display section 2 is divided into areas AR1 and AR2, and the area AR1 is in the through state or is displaying a regular image, while the area AR2 is displaying an image obtained from the storage section 25 or the communication section 26 (e.g., an image of a video content that has been reproduced or received), for example.

(c) of FIG. 9 illustrates another exemplary split screen display, in which the screen of the display section 2 is divided into areas AR1, AR2, AR3, and AR4, and each of the areas displays a separate one of image frames extracted at intervals of a predetermined time. For example, the display image processing section 12 is caused to extract frames from the image data at intervals of 0.5 seconds, and display images of the extracted frames sequentially in the areas in the following order: AR1→AR2→AR3→AR4→AR1→AR2 and so on. This is an example in which so-called stroboscopic display of images is achieved by the split screen display on the display section 2.

Needless to say, different areas of the screen may display images obtained from different sources.

(a) of FIG. 10 illustrates a case where an image obtained from the imaging function system, the reproducing function system, or the receiving function system is being displayed on the display section 2 in a normal size.

At this time, the system controller 10 is capable of instructing the display image processing section 12 via the display control section 14 to perform an image magnification process to display a magnified image as illustrated in (b) of FIG. 10 on the display section 2.

(a) of FIG. 11 illustrates a case where an image obtained from the imaging function system, the reproducing function system, or the receiving function system is being displayed on the display section 2 in a regular manner.

It is assumed that this display image is an image with low brightness, which cannot be viewed by the user comfortably.

In such a case, the system controller 10 is capable of instructing the display control section 14 (the display image processing section 12 and the display driving section 13) to increase the brightness or control the contrast or sharpness, for example, to display a clearer image as illustrated in (b) of FIG. 11 on the display section 2.

(a) of FIG. 12 illustrates a case where an image obtained from the imaging function system, the reproducing function system, or the receiving function system is being displayed on the display section 2 in a regular manner, or a case where the display section 2 is in the through state. In this image, a boundary between a shady region and a sunny region appears on a pitch in the soccer stadium, for example, resulting in poor visibility.

The system controller 10 instructs the display image processing section 12 to increase the display brightness of pixels in an area corresponding to the shady region and decrease the display brightness of pixels in an area corresponding to the sunny region, for example, to display an image as illustrated in (b) of FIG. 12 in which influence of the sunny and shady regions on the poor visibility is reduced.

(c) of FIG. 12 illustrates an exemplary display in which a specified object (i.e., a bird in this example) included in an image is highlighted so that the specified object will stand out in the image.

When the image is displayed such that the bird detected in the image is highlighted, it is easy for the user to find the bird, i.e., an example of the specified object.

There are various possible methods for highlighting the specified object in the image, such as: a method of increasing the brightness of only a part of the image on which attention should be concentrated; a method of decreasing the brightness of the other parts of the image than the part on which attention should be concentrated; and a method of displaying the part of the image on which attention should be concentrated in color and the other parts of the image in black and white. Alternatively, a specified part of the image may be highlighted by displaying a highlighting frame or cursor, a pointer mark, or some other character image at the part of the image on which attention should be concentrated.

Although various exemplary displays have been described above, they are simply examples. In the present embodiment, various display modes can be achieved by selection of the source (i.e., the imaging function system, the reproducing function system, or the receiving function system), control of the operations of the imaging function system and the reproducing function system, and control of the processing and operations of the display image processing section 12 and the display driving section 13.

In the case where the source of the display image is the imaging function system, for example, the following types of display are possible, for example: telephotographic display; wide-angle display; display involving zooming in and zooming out; magnified display; reduced display; display involving variable control of the frame rate (e.g., imaging with a high frame rate or a low frame rate); high-brightness display; low-brightness display; display involving variable control of the contrast; display involving variable control of the sharpness; display with increased imaging sensitivity; display with increased infrared imaging sensitivity; display with increased ultraviolet imaging sensitivity; and display of an image in which a particular wavelength range is cut off.

In the case where the source of the display image is the reproducing function system or the receiving function system, the following types of display are possible, for example: image display involving variable speed playback, such as fast playback, slow playback, frame-by-frame playback, or the like; and the same types of display that is achieved in the personal computer or the like, such as switching of a display page, scrolling, and the like.

It is also conceivable that the processing by the display image processing section 12 achieves display of an effect-applied image, such as a mosaic image, a brightness-reversed image, a soft-focus image, an image with a part of the image highlighted, an image with overall color atmosphere varied, or an image to which any combination of the above effects is applied.

Further, a great variety of other display modes are also conceivable such as: split screen display that combines some types of image display mentioned above; split screen display that combines the through state and the photographed image (or the reproduced image or the received image); and still image display in which display of one frame of the photographed image (or the reproduced image or the received image) is caused to continue.

[4. Detection of Outside World Information]

As described above, the display apparatus 1 according to the present embodiment has, as the units for acquiring the outside world information, the surrounding environment sensor 19, the imaging object sensor 20, the GPS receiver section 21, the date/time calculation section 22, the image analysis section 17, and the communication section 26.

Examples of the surrounding environment sensor 19 include the illumination sensor, the temperature sensor, the humidity sensor, and the atmospheric pressure sensor.

The illumination sensor is capable of detecting information on the brightness of the surroundings of the display apparatus 1.

The temperature sensor, the humidity sensor, and the atmospheric pressure sensor are capable of obtaining information for determining the temperature, the humidity, the atmospheric pressure, or the weather.

By using these surrounding environment sensors 19, the display apparatus 1 is able to determine the brightness of the surroundings or, when located outdoors, weather conditions or the like. Accordingly, the system controller 10 is able to use such information as the outside world information to control the display operation appropriately in accordance with the brightness or weather conditions of the surroundings.

In the case of the structure as illustrated in FIG. 3, the display apparatus 1 includes the imaging object sensor 20 for detecting the information concerning the imaging object. Examples of the imaging object sensor 20 include the distance-measuring sensor and the pyroelectric sensor, and in these cases, it is possible to obtain the distance to the imaging object or information for identifying the imaging object itself.

By detecting the distance to the imaging object, the system controller 10 is able to control the display operation in accordance with the detected distance. By detecting that the imaging object is a living body such as a human being, the system controller 10 is able to control the display operation in accordance with the imaging object.

The GPS receiver section 21 acquires the information on the latitude and longitude of the current position. When the latitude and longitude has been detected, it is possible to obtain information concerning a place (or the neighborhood of a place) at the current position by referring to a map database or the like. Although no particular mention has been made when describing the structures of FIGS. 3 and 4, as a storage medium that the system controller 10 is able to refer to, for example, a storage medium having a relatively large capacity such as an HDD (hard disk drive), flash memory, or the like may be included, and this storage medium may store the map database. This makes it possible to acquire information related to the current position.

It is not necessary, however, that the display apparatus 1 contain the map database. For example, the display apparatus 1 may access a network server or a device that contains the map database via the communication section 26, transmit the latitude and longitude of the current position thereto to request the information related to the current position, and receive the information.

Examples of the information related to the current position include name information such as a name of a place, a name of a structure, a name of a facility, a name of a store, and a name of a station at or near the current position.

Other examples of the information related to the current position include information representing the type of a structure such as a park, a theme park, a concert hall, a theater, a movie theater, a sports facility, or the like.

Other examples of the information related to the current position include information on the type or name of a natural object, such as a seashore, a sea, a river, a mountainous region, a mountain peak, a forest, a lake, a plain, or the like.

Further, as more detailed position information, it is possible to acquire information on an area within the theme park, the stands in a ballpark, the soccer stadium, or the like, seats in the concert hall, and the like as the information concerning the current position.

By acquiring the information concerning the current position, the system controller 10 is able to control the display operation in accordance with geographical conditions or facilities at or near the current position.

The date/time calculation section 22 calculates the date and time (year, month, day, hour, minute, second), for example. By using the date/time calculation section 22, the system controller 10 is able to recognize the current time, whether it is day or night now, the month, a season, and the like. Accordingly, the system controller 10 is able to control the display operation appropriately in accordance with whether it is day or night (i.e., the time) or in accordance with the current season, for example.

The image analysis section 17 is capable of detecting the following various types of information from the input image data, such as the photographed image, the received image, or the reproduced image.

First, it is possible to identify a person, an animal, a natural object, a structure, a device, and the like included in the image of the image data supplied from any of the sources. Regarding the animal, for example, it is possible to recognize a situation in which a bird is included in the image, a situation in which a cat is included in the image, and so on. Regarding the natural object, it is possible to identify a sea, a mountain, a tree, a river, a lake, the sky, the sun, the moon, and so on. Regarding the structure, it is possible to identify a house, a building, a stadium, and so on. Regarding the device, it is possible to recognize a situation in which a personal computer, audiovisual (AV) equipment, a mobile phone, a PDA, an IC card, a two-dimensional bar code, or the like is included in the image. In the case where an object to be analyzed is the data of the image photographed by the imaging section 3 or the data of the image photographed by the external imaging apparatus 70, for example, it is possible to determine whether or not any of the above specified objects is the imaging object.

Identification of the type of such a specified object is possible by registering characteristics of the shapes of the various types of objects beforehand, and determining whether the input image data includes an object that coincides in shape with any of the various types of objects.

The image analysis performed by the image analysis section 17 is able to detect a motion, e.g., a quick motion, of an object in the image using a method of detecting differences between adjacent frames of the image. In the case where the image analyzed is an image of a sport or an image of a car or the like that is moving, for example, it is possible to detect a situation in which an object that moves fast is included in the image.

In addition, in the case where the data of the image photographed by the imaging section 3 is subjected to image analysis in the image analysis section 17, it is also possible to determine surrounding conditions. For example, it is possible to determine brightness conditions, which varies depending on whether it is day or night now and depending on the weather, and it is also possible to recognize the intensity of rain and the like.

In addition, the image analysis performed by the image analysis section 17 is able to determine that a book, a newspaper, a letter image, or the like is included in the input image data, such as the photographed image, the received image, the reproduced image, or the like. This is achieved by performing character recognition in the image, or recognizing the shape of the book, the newspaper, or the like, for example.

In the case where the image analysis section 17 has performed the character recognition, the system controller 10 is able to supply a recognized letter to the speech synthesis section 29 as text data.

In addition, in the case where the image data includes a person, the image analysis performed by the image analysis section 17 is able to identify the person based on the face of the person. As is known, human faces can be analyzed to obtain information on relative positions of face components, and this information can be used as personal characteristic data. For example, a ratio (Ed/EN) of a distance Ed between eyes to a distance EN between the center of an eye and a nose, and a ratio (Ed/EM) of the distance Ed between the eyes to a distance EM between the center of the eye and a mouth are known to be information that is particular to each individual and is not affected by changes in appearance caused by hair style, a worn object such as spectacles, or the like. It is also known that these ratios are not changed by aging.

Thus, in the case where a face of a certain person is included in the image data, the image analysis section 17 is able to analyze the image data to detect the personal characteristic data as described above.

Suppose that the display apparatus 1 includes, as the storage medium that the system controller 10 is capable of referring to, for example, the hard disk drive (HDD), the flash memory, or the like, and that a people database is stored in this storage medium. In this case, when the personal characteristic data is detected from the image data, it is possible to acquire information of an individual included in the image data. However, it is not necessary that the display apparatus 1 contain the people database. For example, the display apparatus 1 may access the network server or a device that contains the people database, for example, via the communication section 26, transmit the personal characteristic data thereto to request the information, and receive the information on the particular person.

For example, the user may register personal information on a person with whom the user met in the past, such as the name, position, or the like of that person, in the people database together with the personal characteristic data of that person. In this case, when this person is included in the image data, the system controller 10 is able to retrieve the information on this person.

Further, people database in which information on celebrities and the personal characteristic data of the celebrities are registered may be prepared. In this case, when any of the celebrities is included in the image data, the system controller 10 is able to retrieve information on that celebrity.

The communication section 26 is able to acquire various types of information as the outside world information.

For example, the communication section 26 is able to acquire information that has been retrieved in the external device in accordance with the latitude and longitude of the current position, the personal characteristic data, or the like transmitted from the display apparatus 1 as described above.

Further, the communication section 26 is able to acquire, from the external device, information concerning the weather conditions, such as weather information, temperature information, humidity information, or the like.

Still further, the communication section 26 is able to acquire, from the external device, information concerning use of a facility, information on whether photography is prohibited or permitted in the facility, guide information, or the like.

Still further, the communication section 26 is able to acquire identification information on the external device. Examples of the identification information on the external device include a type, a device ID, and the like of a device that is identified as a network device in a predetermined communications protocol.

Still further, the communication section 26 is able to acquire image data stored in the external device, image data reproduced or displayed in the external device, image data received by the external device, and so on.

Examples of the information that can be acquired by each of the surrounding environment sensor 19, the imaging object sensor 20, the GPS receiver section 21, the date/time calculation section 22, the image analysis section 17, and the communication section 26 have been described above. Some types of outside world information may be detected by two or more of the above units.

For example, a combination of the information on the humidity or the like acquired by the surrounding environment sensor 19 and the weather information received by the communication section 26 can be used to recognize the current weather more precisely.

Further, a combination of the information concerning the current position acquired by the operations of the GPS receiver section 21 and the communication section 26 and the information acquired by the image analysis section 17 can be used to recognize the conditions of the current position or the imaging object more precisely.

[5. Various Exemplary Operations]

In the display apparatus 1 according to the present embodiment, the system controller 10 exercises control related to the display operation in accordance with the outside world information that can be acquired via the surrounding environment sensor 19, the imaging object sensor 20, the GPS receiver section 21, the date/time calculation section 22, the image analysis section 17, or the communication section 26 as described above to present an appropriate or entertaining display in accordance with the situation on the display section 2. Thus, a variety of images can be provided to the user.

Various exemplary operations for achieving the above based on the control exercised by the system controller 10 will now be described below.

Figure 13:
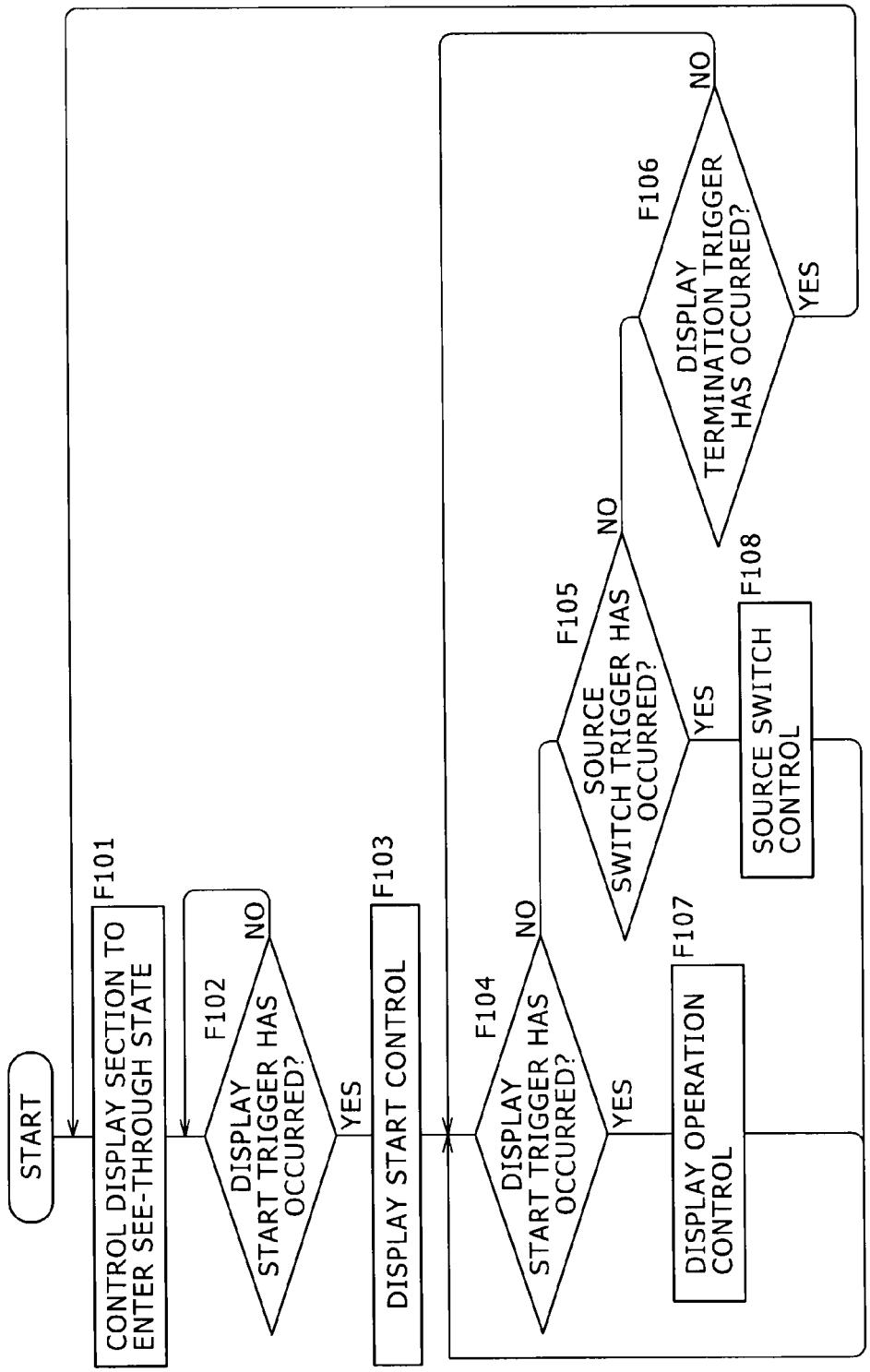
FIG. 13 is a flowchart illustrating a control procedure according to one embodiment.

FIG. 13 illustrates a control procedure performed by the system controller 10 as the operation control function 10b.

At step F101, the system controller 10 controls the display control section 14 to cause the display section 2 to enter the through state. When the display apparatus 1 is in an initial stage, i.e., when power of the display apparatus 1 has been turned on, for example, the system controller 10 controls the display section 2 to enter the through state at step F101.

While the display section 2 is in the through state, the system controller 10 continues to check whether or not a display start trigger has occurred at step F102. Although not illustrated in FIG. 3 or 4, for example, a user-operable operation unit may be included so that the user can operate a predetermined operation unit to cause the display section 2 to start displaying. When the user has operated this predetermined operation unit, the system controller 10 may determine that the display start trigger has occurred, for example. Note, however, that the system controller 10 may determine that the display start trigger has occurred based on the outside world information. Specific examples thereof will be provided later.

If it is determined that the display start trigger has occurred, the system controller 10 proceeds to step F103, and performs display start control. That is, the system controller 10 instructs the display control section 14 to control the display image processing section 12 and the display driving section 13 to display the supplied data on the display section 2 in the mode of the regular photographed image.

The image data is supplied to the display image processing section 12 via the image input/output control section 27. In the case where a plurality of sources of the image data as illustrated in FIGS. 3 and 4 are included, for example, it may be so arranged that, at this point, the image data is supplied from one of the imaging function system (i.e., the imaging section 3 and the imaging signal processing section 15), the reproducing function system (i.e., the storage section 25), and the receiving function system (i.e., the communication section 26) that is selected as a default source to the display image processing section 12. In the case where the imaging function system is selected as the default source, for example, the system controller 10, at the time of the display start control at step F103, issues an instruction to start imaging to the imaging control section 11 and causes the imaging section 3 and the imaging signal processing section 15 to perform a regular imaging operation, and causes the resulting imaging signal (i.e., the image data) to be supplied to the display image processing section 12 via the image input/output control section 27. In this case, the display section 2 switches from the through state as illustrated in (a) of FIG. 5, for example, to the state in which the regular photographed image is displayed as illustrated in (b) of FIG. 5, for example.

Meanwhile, in the case where the storage section 25 is selected as the default source, the system controller 10, at the time of the display start control, may control the storage section 25 as well and cause the display section 2 to display a menu screen for reproduction of the content, selection of the content, and the like. Meanwhile, in the case where the communication section 26 is selected as the default source, the system controller 10, at the time of the display start control, may control the operation of the communication section 26 as well and cause the display section 2 to display a screen to be used for communication or present a display based on the data received from the external device.

Needless to say, in the case where the display apparatus 1 has only one source of the image data, the image data may be supplied from that source to the display image processing section 12.

Further, it is possible that, at the time of the display start control at step F103, the supply of the image data from the image source is not carried out and that the system controller 10 control a menu screen, a source selection screen, or the like to be displayed on the display section 2 as an initial screen.

Although an operation of outputting audio via the audio output section 5 is not described in this description of the procedure of FIG. 13, it should be noted that, when the display section 2 performs the display operation, the system controller 10 may control the audio input/output control section 28 and the audio signal processing section 16 to carry out the output of the audio based on the audio data supplied from the same source as that of the display image.

While the display section 2 is displaying an image obtained from a certain source, the system controller 10 monitors whether or not a display control trigger has occurred at step F104, monitors whether or not a source switch trigger has occurred at step F105, and monitors whether or not a display termination trigger has occurred at step F106.

Occurrence of the display control trigger means that, based on the outside world situation determined by the outside world situation determination function 10a, the system controller 10 itself decides to make a change to processing related to the mode of the display image in the display operation or the image data to be displayed, for example.

Occurrence of the source switch trigger means that, in the case where the display apparatus 1 includes a plurality of sources as illustrated in FIGS. 3 and 4, for example, the system controller 10 itself decides to switch the source of the image data to be displayed, based on the outside world situation determined by the outside world situation determination function 10a.

Specific examples of manners for determining whether the display control trigger or the source switch trigger has occurred and specific examples of control will be described later.

The display termination trigger is a trigger that initiates termination of the displaying of the display section 2 and switching of the display section 3 to the through state. The system controller 10 may determine that the display termination trigger has occurred based on a user operation (a predetermined operation for terminating the displaying), for example. In addition, the system controller 10 may determine that the display termination trigger has occurred based on the outside world information. Examples thereof will be described later.

If it is determined that the display control trigger has occurred, the system controller 10 proceeds from step F104 to step F107, and performs control related to the operation of displaying the image. That is, the system controller 10 issues a predetermined instruction to the display control section 14 to cause the display section 2 to present a display in a mode appropriate for the outside world situation at the time. Depending on the source selected at the time, the system controller 10 may perform control of the imaging function system, operation control related to the storage section 25, or operation control related to the communication section 26.

After performing the control of the display operation at step F107, the system controller 10 monitors the occurrence of the triggers at steps F104, F105, and F106.

If it is determined that the source switch trigger has occurred, the system controller 10 proceeds from step F105 to step F108, and performs source switch control. In this case, the system controller 10 performs operation control related to the source that is being selected before source switching and the source that will be selected after source switching, and controls the image input/output control section 27 and/or the audio input/output control section 28 so that the image data and/or the audio data will be supplied from the newly selected source to the display image processing section 12 and/or the audio signal processing section 16.

As a result of the performance of this source switch control, the state of the display section 2 is switched from a state in which the image photographed by the imaging section 3 is being displayed to a state in which the image reproduced in the storage section 25 is being displayed, for example.

After performing the source switch control at step F108, the system controller 10 monitors the occurrence of the triggers at steps F104, F105, and F106.

If it is determined that the display termination trigger has occurred, the system controller 10 returns from step F106 to step F101, and instructs the display control section 14 to cause the display section 2 to enter the through state. In addition, the system controller 10 instructs the image source selected at the time to terminate the operation of supplying the image.

While the user is wearing the display apparatus 1 and keeping the power thereof on, the operation control function 10b of the system controller 10 continues to perform the control procedure as illustrated in FIG. 13, for example.

According to this procedure, the display start control is performed when it is determined that the display start trigger has occurred; display mode control is performed when it is determined that the display control trigger has occurred; the source switch control is performed when it is determined that the source switch trigger has occurred; and control of terminating the displaying of the display section 2 and causing the display section 2 to enter the through state is performed when it is determined that the display termination trigger has occurred. Specific examples of the manners for determining whether these triggers have occurred and specific examples of control will now be described below with reference to FIG. 14 and subsequent figures.

FIGS. 14 to 23 illustrate exemplary procedures performed by the system controller 10 as the outside world situation determination function 10a. It is assumed that these procedures are performed in parallel with the procedure of FIG. 13 performed by the operation control function 10b. The parallel processing is achieved, for example, by detection procedures as illustrated in FIGS. 14 to 23 being regularly handled as interrupts while the system controller 10 is performing the procedure of FIG. 13. Programs for the procedures as illustrated in FIGS. 13 to 19 may either be incorporated in a program for executing the procedure of FIG. 13, or be separate programs that are called up regularly. That is, the forms of the programs are not limited.

FIGS. 14 to 21 illustrate exemplary procedures related to the determination of the occurrence of the display control trigger performed at step F104 in FIG. 13. First, with reference to FIG. 14, an exemplary procedure for determining the occurrence of the display control trigger based on the information obtained from the surrounding environment sensor 19 or the image analysis section 17 will now be described below.

Figure 14:
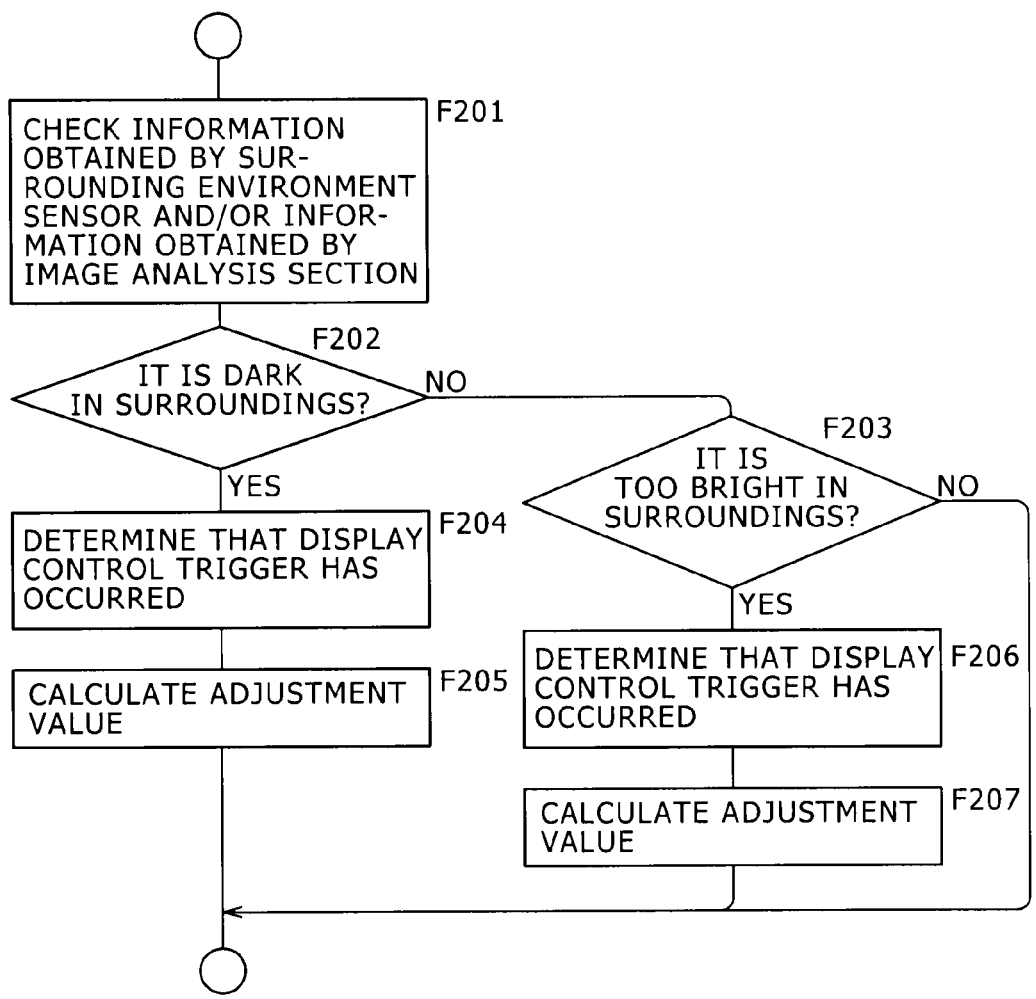
FIG. 14 is a flowchart illustrating a procedure for determining occurrence of a display control trigger according to one embodiment.

At step F201 in FIG. 14, the system controller 10 monitors one or both of the information obtained by the surrounding environment sensor 19 and the information obtained by the image analysis section 17. It is assumed here that the surrounding environment sensor 19 is the illumination sensor, and that the image analysis section 17 is performing a process of analyzing the photographed image to determine the brightness of the surroundings.

Note that in the structure of FIG. 4, the image analysis section 17 is not capable of analyzing data of a photographed image of a place nearby unless the external imaging apparatus 70 is placed nearby, and therefore the system controller 10 normally checks only the surrounding environment sensor 19.

Based on one or both of the information obtained from the surrounding environment sensor 19 and the information obtained from the image analysis section 17, the system controller 10 determines whether or not it is dark in the surroundings, or whether or not it is too bright in the surroundings. For example, detected illumination is converted into numerical form, and when the detected illumination is lower than x lux, the system controller 10 determines that it is dark in the surroundings, and when the detected illumination is higher than y lux, the system controller 10 determines that it is too bright in the surroundings.

If it is determined that it is dark in the surroundings, the system controller 10 proceeds from step F202 to step F204, and determines that the display control trigger has occurred. Then, at step F205, the system controller 10 calculates an adjustment value in accordance with the current illumination (darkness) in the surroundings. For example, an adjustment value for the display brightness, the contrast, the sharpness, or the like is calculated.

If it is determined that it is too bright in the surroundings, the system controller 10 proceeds from step F203 to F206, and determines that the display control trigger has occurred. Then, at step F207, the system controller 10 calculates an adjustment value for the display brightness, the contrast, the sharpness, or the like in accordance with the current illumination in the surroundings.

As a result of processes of steps F204 and F205 or processes of steps F206 and F207, control in the procedure of FIG. 13 performed by the system controller 10 proceeds from step F104 to step F107, and in this case, the system controller 10 instructs the display image processing section 12 to perform a process such as the brightness control, the contrast control, or the sharpness control.

As a result of this process, the image quality of the image displayed on the display section 2 is adjusted, so that an image adjusted in accordance with the brightness of the surroundings is displayed thereon. As an example of adjustment in accordance with the brightness of the surroundings, it is conceivable that, in the case where the screen is divided such that the photographed image of the video content or the like is displayed in a part of the screen while the remaining part of the screen is in the through state or is displaying the regular photographed image (i.e., the image of the outside scene viewed by the user) as illustrated in (b) of FIG. 9, for example, the image quality of the image of the video content is adjusted. For example, the image quality of the image of the video content is adjusted so that the through part of the screen and the image of the video content are balanced in terms of brightness, and that the user might not feel uncomfortable in viewing. In the case where it is dark in the surroundings and therefore the through part of the screen is dark, for example, the image quality of the video content may accordingly be caused to decrease in brightness so as not to be too dazzling. Conversely, in the case where it is bright in the surroundings and therefore the brightness of the through part of the screen is high, for example, the image quality of the video content may be caused to increase in brightness, or the contrast or sharpness may be enhanced so that visibility will be improved. Alternatively, the through part of the screen may be caused to decrease in transmissivity.

Further, even if the split screen display is not being performed, the display on the screen of the display section 2 is affected by outside light when the received image obtained from the communication section 26 or the reproduced image obtained from the storage section 25 is being displayed on the display section 2. Therefore, it is preferable that the display brightness, the contrast, the sharpness, or the like be adjusted in accordance with the brightness of the surroundings so that the user can view the image more clearly.

In the case where the photographed image obtained from the imaging function system is being displayed on the display section 2, if it is dark in the surroundings, the display brightness, the contrast, and the sharpness may be caused to increase so that the user can view the surroundings more clearly via the image displayed on the display section 2. For example, it is conceivable that when it is dark in the surroundings and thus the display image on the display section 2 is in the state as illustrated in (a) of FIG. 11, the adjustment is performed to achieve the good-visibility state as illustrated in (b) of FIG. 11.

Note that in the case where it has been determined that it is dark in the surroundings, the system controller 10 may control the illumination section 4 to provide illumination.

In the case where the image obtained from the imaging function system is being displayed on the display section 2 and it is too bright in the surroundings, the display brightness may be caused to decrease so that the user might not feel his or her eyes dazzled.

Figure 15:
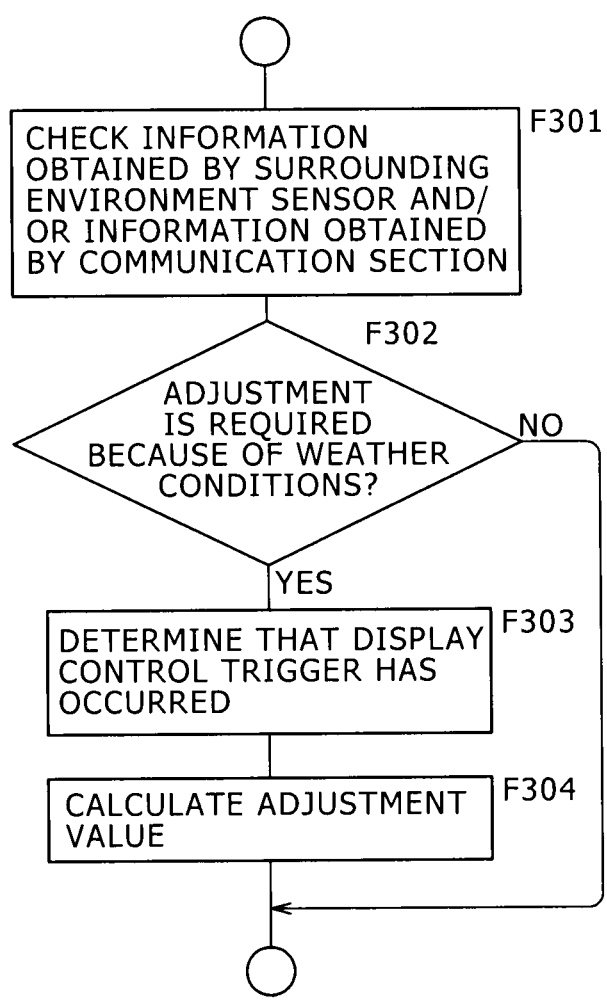
FIG. 15 is a flowchart illustrating a procedure for determining occurrence of a display control trigger according to one embodiment.

FIG. 15 illustrates an exemplary procedure for determining the occurrence of the display control trigger based on the information obtained from the surrounding environment sensor 19 or the information obtained from the communication section 26.

At step F301 in FIG. 15, the system controller 10 monitors one or both of the information detected by the surrounding environment sensor 19 and the information received by the communication section 26. Examples of the surrounding environment sensor 19 include the temperature sensor, the humidity sensor, and the atmospheric pressure sensor. It is assumed here that the communication section 26 regularly receives the weather information from the network server or the like, for example.

The system controller 10 is able to determine the weather conditions of the surroundings based on the information on the atmospheric pressure, the humidity, and the temperature obtained by the surrounding environment sensor 19, for example. In addition, the system controller 10 is able to determine the weather conditions based on the weather information received by the communication section 26. Note that, in order to receive the information on the weather conditions from the network server, the system controller 10 may transmit the information on the current position obtained by the GPS receiver section 21 regularly to the network server to receive, from the network server, weather information on an area to which the current position belongs.

The system controller 10 is able to determine the weather conditions of the surroundings based on the information detected by the surrounding environment sensor 19 or the information received by the communication section 26, but use of both the information makes it possible to recognize the weather conditions more precisely.

The system controller 10 determines whether or not image adjustment is required in accordance with the weather conditions, such as fine weather, cloudy weather, rainy weather, a thunderstorm, a typhoon, or a snowfall, or a change in the weather conditions, such as start of rainfall, stopping of rainfall, or darkening of the sky. If it is determined that the image adjustment is required, the system controller 10 proceeds from step F302 to step F303, and determines that the display control trigger has occurred. Then, at step F304, the system controller 10 calculates an adjustment value in accordance with the current weather. For example, an adjustment value for the display brightness, the contrast, the sharpness, color processing, or the like is calculated.

As a result of processes of steps F303 and F304, control in the procedure of FIG. 13 performed by the system controller 10 proceeds from step F104 to step F107, and in this case, the system controller 10 instructs the display image processing section 12 to perform a process such as the brightness control, the contrast control, the sharpness control, the color processing, or the like. As a result of this process, the image quality of the image displayed on the display section 2 is adjusted so as to be suitable for the weather conditions.

For example, the image quality of the image displayed on the display section 2 is adjusted in accordance with the brightness of the surroundings, which varies depending on the weather, so that the user will feel the display image on the display section 2 clearer.

In addition, it is conceivable that the image quality is adjusted so as to have an atmosphere suitable for an image of the weather. When it is snowing, for example, blue may be enhanced to display an image that is suited to an image of the temperature of the surroundings, or conversely, red may be enhanced to allow the image quality to give an impression of warmth as opposed to coldness.

Note that in the case where the display apparatus 1 has the structure as illustrated in FIG. 3 and the photographed image is being displayed on the display section 2, the system controller 10 may control the illumination section 4 to provide illumination depending on the weather.

Also note that although it has been assumed here that the weather is determined based on the information obtained by the surrounding environment sensor 19 or the information received by the communication section 26, recognition of a rain image by the image analysis section 17 allows accurate detection of the start or stop of rainfall, occurrence of lightening, or the like.

Next, with reference to FIG. 16, an exemplary procedure for determining the occurrence of the display control trigger based on the information obtained from the surrounding environment sensor 19 will now be described below.

Figure 16:
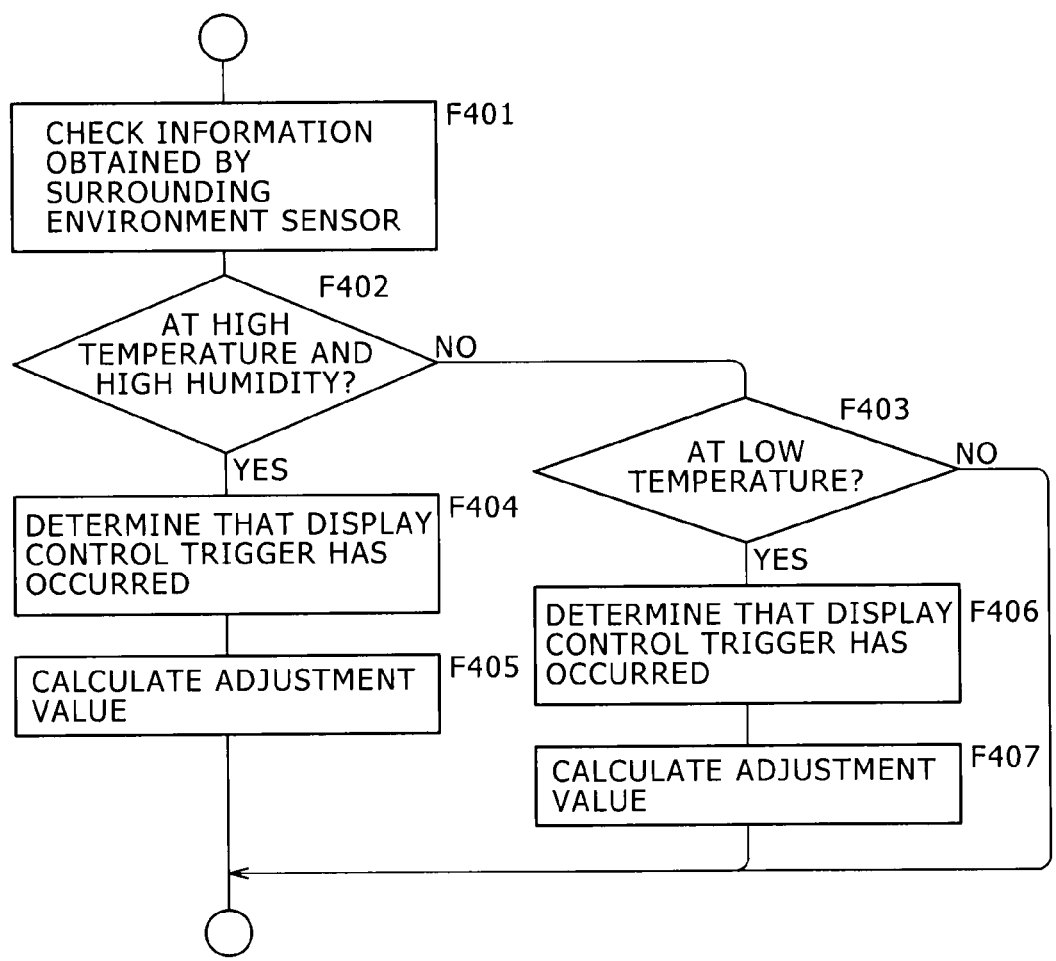
FIG. 16 is a flowchart illustrating a procedure for determining occurrence of a display control trigger according to one embodiment.

At step F401 in FIG. 16, the system controller 10 monitors the information obtained by the surrounding environment sensor 19. It is assumed here that the surrounding environment sensor 19 is composed of the temperature sensor and the humidity sensor.

Based on the information detected by the surrounding environment sensor 19, the system controller detects current temperature and humidity conditions of the surroundings, and determines whether or not the surroundings are at high temperature and high humidity, and whether or not the surroundings are at low temperature, for example.

If it is determined that the surroundings are at high temperature and high humidity, making the user feel uncomfortable, the system controller 10 proceeds from step F402 to step F404, and determines that the display control trigger has occurred. Then, at step F405, the system controller 10 calculates an adjustment value for the sharpness, the color processing, an image effect, or the like, for example.

Meanwhile, if it is determined that the surroundings are at low temperature, making the user feel the cold, the system controller 10 proceeds from step F403 to step F406, and determines that the display control trigger has occurred. Then, at step F407, the system controller 10 calculates an adjustment value for the sharpness, the color processing, the image effect, or the like, for example.

As a result of processes of steps F404 and F405 or processes of steps F406 and F407, control in the procedure of FIG. 13 performed by the system controller proceeds from step F104 to step F107, and the system controller 10 instructs the display image processing section 12 to adjust the image data with respect to the display brightness, the contrast, the sharpness, the color processing, the image effect, or the like.

In the case where the photographed image, the reproduced image, or the received image is displayed, if the surroundings are at high temperature and high humidity, for example, the above adjustment process may change the image into an image tinted with a cool shade of blue or similar colors, for example, and if the surroundings are at low temperature, the above adjustment process may change the image into an image that gives an impression of warmth by a process of tinting the image with a shade of red or similar colors, applying a soft focus effect to the image, or the like, for example.

Note that although, in the above example, determination has been made with respect to conditions of "high temperature and high humidity" and "low temperature," additional determination may be made with respect to a condition of "low humidity." For example, it may be so arranged that it is determined whether or not the surroundings are at "high temperature and high humidity" and whether or not the surroundings are at "low temperature and low humidity," and that image control is performed in accordance with the determinations. Further, for example, it may be so arranged that determination is made with respect to four conditions of "high temperature and high humidity," "high temperature and low humidity," "low temperature and high humidity," and "low temperature and low humidity," and that image control is performed in accordance with the determinations.

Figure 17:
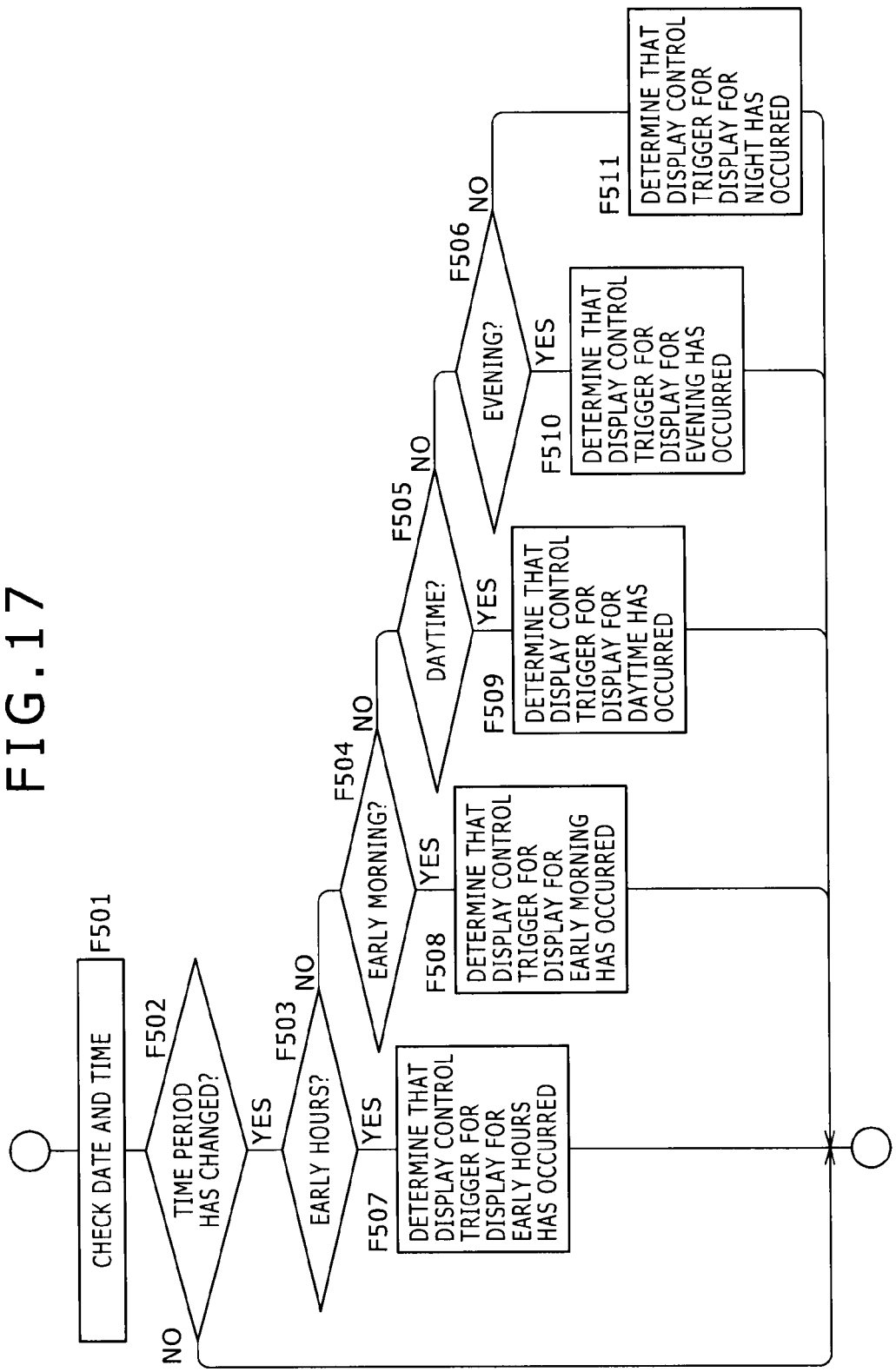
FIG. 17 is a flowchart illustrating a procedure for determining occurrence of a display control trigger according to one embodiment.

FIG. 17 illustrates an exemplary procedure for determining the occurrence of the display control trigger based on the information on the current time obtained by the date/time calculation section 22.

At step F501 in FIG. 17, the system controller 10 checks the current date and time calculated by the date/time calculation section 22. Based on the current time, the system controller 10 determines a time period within which the current time falls. Examples of the time period include early hours, early morning, daytime, evening, and night. For example, the early hours are assumed to range from 4 to 7, the early morning from 7 to 9, the daytime from 9 to 17, the evening from 17 to 19, and the night from 19 to 4.

Note that a criterion for separating the time into the time periods may be changed depending on the month and day. For example, considering that sunrise and sunset differ depending on the month and day, a time range of any of the above time periods may be changed. For example, the time period "early hours" may be determined to range from 4 to 7 in summer, and from 6 to 8 in winter.

The system controller 10 determines whether the time period of the current date and time has changed, based on the time period of the current time determined by the date and time check performed at step F501. If it is determined that the time period of the current date and time has changed, the system controller 10 proceeds from step F502 to step F503 and subsequent steps.

For example, when the current time falls within the early hours, the system controller 10 proceeds from step F503 to step F507, and determines that a display control trigger for a display operation for the early hours has occurred.

When the current time falls within the early morning, the system controller 10 proceeds from step F504 to step F508, and determines that a display control trigger for a display operation for the early morning has occurred.

When the current time falls within the daytime, the system controller 10 proceeds from step F505 to step F509, and determines that a display control trigger for a display operation for the daytime has occurred.

When the current time falls within the evening, the system controller 10 proceeds from step F506 to step F510, and determines that a display control trigger for a display operation for the evening has occurred.

When the current time falls within the night, the system controller 10 proceeds to step F511, and determines that a display control trigger for a display operation for the night has occurred.

If it is determined at any of steps F507, F508, F509, F510, and F511 that the display control trigger has occurred, control in the procedure of FIG. 13 performed by the system controller 10 proceeds from step F104 to step F107, and the system controller 10 instructs the display control section 14 to perform the display operation in accordance with the current time period. For example, the system controller 10 instructs the display control section 14 to perform a process such as the display brightness control, the contrast control, the sharpness control, color control, or the like. In addition, the system controller 10 may instruct the display control section 14 to apply an image effect, such as soft focus display.

As a result of this process, an image that gives an impression suited to the current time period is presented to the user as the photographed image, the reproduced image, or the received image. For example, an image having a soft image quality is presented in the early hours, a sharp high-contrast image is presented in the daytime, an image having a sepia-toned image quality is presented in the evening, and an image having a drab image quality is presented at night. Thus, entertaining images that match moods of the user in the respective time periods can be presented to the user.

Needless to say, image quality control of adjusting the image quality in accordance with the brightness of the current time period in order to improve visibility is also conceivable.

Further, in addition to the time period, the weather conditions and whether the user is currently indoors or outdoors may be determined to adjust the image quality appropriately in accordance with the conditions.

Still further, it may be so arranged that the season, instead of the time period, is determined based on the information on the date and time, and that the image quality is adjusted in accordance with the season. For example, images with a sense of the season may be presented to the user by, in displaying the images, enhancing blue components in summer, red components in fall, white components in winter, and green/pink or similar colors in spring, for example.

Figure 18:
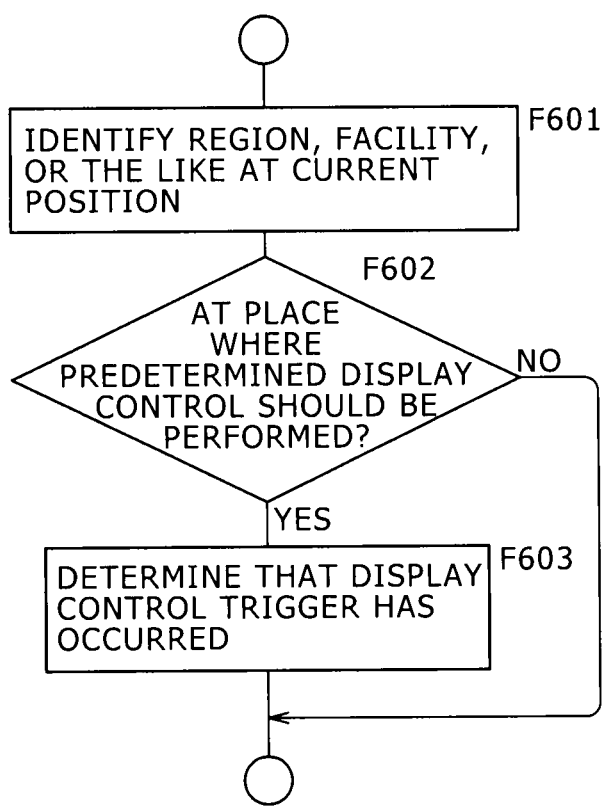
FIG. 18 is a flowchart illustrating a procedure for determining occurrence of a display control trigger according to one embodiment.

FIG. 18 illustrates an exemplary procedure for determining the occurrence of the display control trigger based on the information received by the GPS receiver section 21 and the information received by the communication section 26.

At step F601 in FIG. 18, the system controller 10 transmits the information on the latitude and longitude of the current position obtained by the GPS receiver section 21 to the network server or the device that contains the map database via the communication section 26, and receives information concerning the current position retrieved in the network server or the device that contains the map database. Note that in the case where the display apparatus 1 contains the map database, the system controller 10 is able to retrieve information concerning the current position from this map database based on the information on the latitude and longitude of the current position obtained from the GPS receiver section 21.

Based on the acquired information concerning the current position, the system controller 10 determines whether or not the user is currently at a place where predetermined display control should be performed. If it is determined that the current position is a place where the predetermined display control should be performed, the system controller 10 proceeds from step F602 to step F603, and determines that a display control trigger for performing the predetermined display control has occurred.

As a result of it being determined at step F603 that the display control trigger has occurred, control in the procedure of FIG. 13 performed by the system controller 10 proceeds from step F104 to step F107, and the system controller 10 instructs the display control section 14 to perform predetermined image processing.

Examples of the display control to be performed in this case are as follows.

Suppose, for example, that a seashore, a mountain, an urban area, a rural area, or the like is identified in a region of the current position. In this case, the image quality of the image displayed on the display section 2 may be adjusted in accordance with an image of the seashore, the mountain, the urban area, the rural area, or the like.

Also, based on the acquired information concerning the current position, a place name, the name of the facility, the store, or the like which is being photographed, or the like may be superimposed, in the form of a character image or a letter, on the image displayed on the display section 2. It is also conceivable that advertising information, the guide information on the facility, alarm information concerning a surrounding area, or the like is displayed on the display section 2.

It is also conceivable that the display brightness or the like is controlled depending on whether the user is indoors or outdoors.

Also, in the case where the bird's-eye view image as illustrated in (c) of FIG. 7 is being displayed, it is conceivable that a new image is acquired via the communication section 26 as the current position changes, and that the current image is replaced by the new image acquired.

Figure 19:
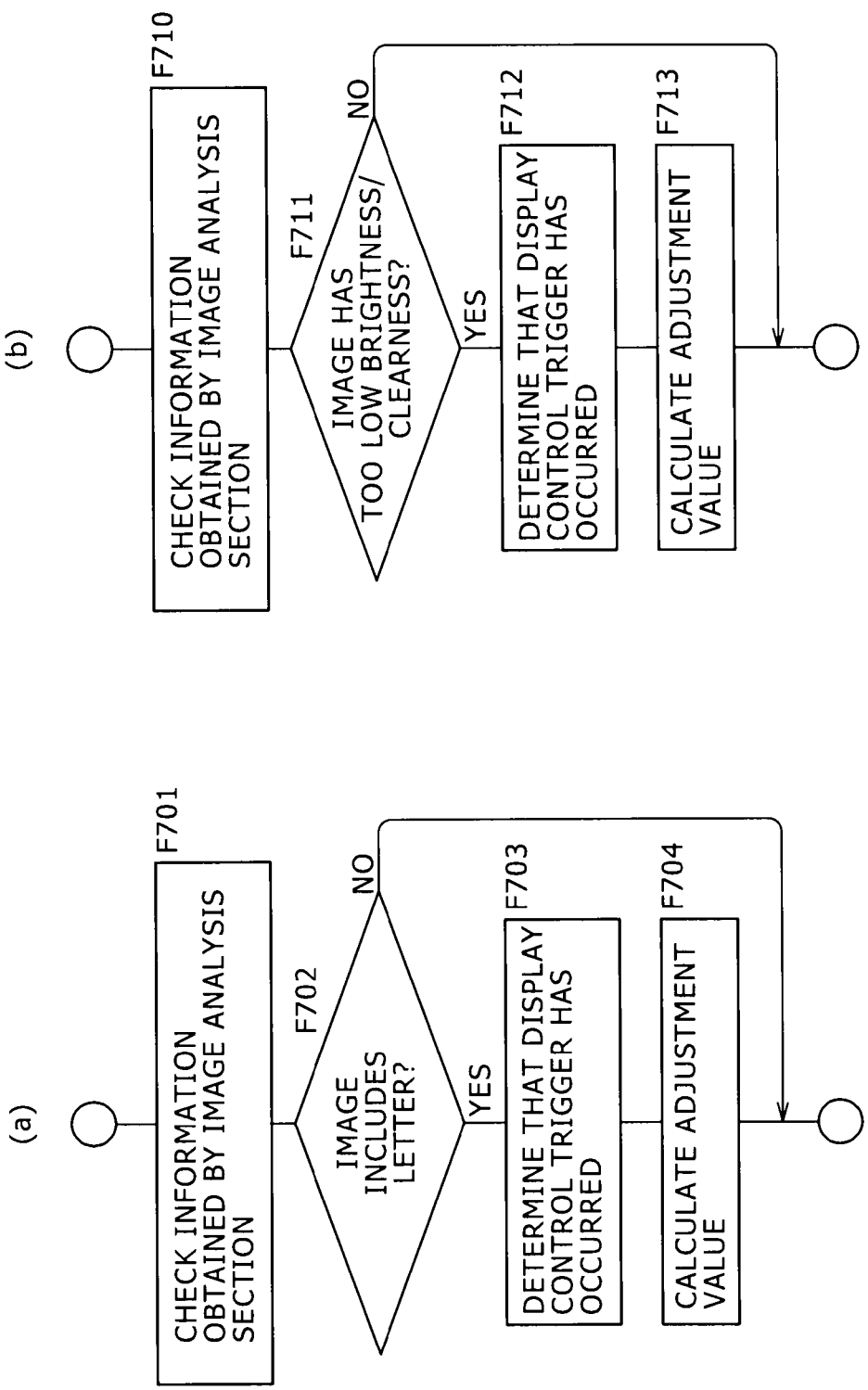
FIG. 19 shows flowcharts illustrating procedures for determining occurrence of a display control trigger according to one embodiment.

(a) of FIG. 19 illustrates an exemplary procedure for determining the occurrence of the display control trigger based on the information obtained from the image analysis section 17. More particularly, in this exemplary procedure, it is determined whether or not the image data includes a letter. Examples of data that includes a letter include data of an image of the newspaper, data of an image of the book, and the image data of the electronic book as illustrated in (c) of FIG. 6.

At step F701 in (a) of FIG. 19, the system controller 10 monitors the information obtained from the image analysis section 17. It is assumed here that the image analysis section 17 performs image analysis to detect whether or not the image data includes a letter.

The system controller 10 determines whether or not the image data includes a letter based on information on a result of the analysis performed by the image processing section 17.

If it is determined that the image data includes a letter, the system controller 10 proceeds from step F702 to step F703, and determines that the display control trigger has occurred.

Then, at step F704, the system controller 10 calculates an adjustment value that is suited to the case where the letter image is read by the user. For example, an adjustment value for the display brightness, the contrast, the sharpness, or the like is calculated so that the user can read the letter displayed on the display screen comfortably.

As a result of processes of steps F703 and F704, control in the procedure of FIG. 13 performed by the system controller 10 proceeds from step F104 to step F107, and in this case, the system controller 10 instructs the display image processing section 12 to perform a process such as the brightness control, the contrast control, the sharpness control, or the like. As a result of this process, the image quality of the image displayed on the display section 2 is adjusted so that letters in the image as illustrated in (c) of FIG. 6, for example, will become easier to read.

Note that it may be so arranged that, in addition to detecting whether or not the image includes a letter, the brightness of the surroundings is detected, and that the detected brightness of the surroundings is taken into account when calculating the adjustment value.

It is also conceivable that, instead of adjusting the image quality, the display image processing section 12 performs the magnification process, for example, to display the magnified image, thereby providing to the user an image with which the user is able to read the letter easily.

In the case where the photographed image obtained from the imaging function system is being displayed on the display section 2, recognition of the shape of the book or newspaper in the image analysis may be added to a condition for proceeding to step F703. In this case, if it is determined that the imaging object is the newspaper or the like, the system controller 10 may control the illumination section 4 to provide illumination.

In the case where the image includes a letter, the image analysis section 17 may identify the letter and supply the letter to the system controller 10 as text data. In this case, the system controller 10 controls the speech synthesis section 29 to perform a speech synthesis process based on the text data detected from the image.

As a result, the audio signal for the read speech reading the letter included in the image data is generated in the speech synthesis section 29. The system controller 10 controls the read speech to be outputted via the audio output section 5. As a result, the user is able to listen to the read speech while viewing the image including the letter displayed on the display section 2.

(b) of FIG. 19 also illustrates an exemplary procedure for determining the occurrence of the display control trigger based on the information obtained from the image analysis section 17. According to this exemplary procedure, visibility of the image data obtained from a certain source is improved.

At step F710 in (b) of FIG. 19, the system controller 10 monitors the information obtained from the image analysis section 17. The image analysis section 17 analyzes the image data to determine whether or not the image is in an appropriate brightness state, or whether or not the image has appropriate clearness.

If it is determined that the image has too low brightness or too low clearness, the system controller 10 proceeds from step F711 to step F712, and determines that the display control trigger has occurred.

Then, at step F713, the system controller 10 calculates an adjustment value for improving the visibility. For example, an adjustment value for the display brightness, the contrast, the sharpness, or the like is calculated which enables the user to view the image on the display screen comfortably.

As a result of processes of steps F712 and F713, control in the procedure of FIG. 13 performed by the system controller 10 proceeds from step F104 to step F107, and in this case, the system controller 10 instructs the display image processing section 12 to perform a process such as the brightness control, the contrast control, the sharpness control, or the like. As a result of this process, the image quality of the image displayed on the display section 2 is adjusted, so that an image that is easy to see is provided to the user.

Figure 20:
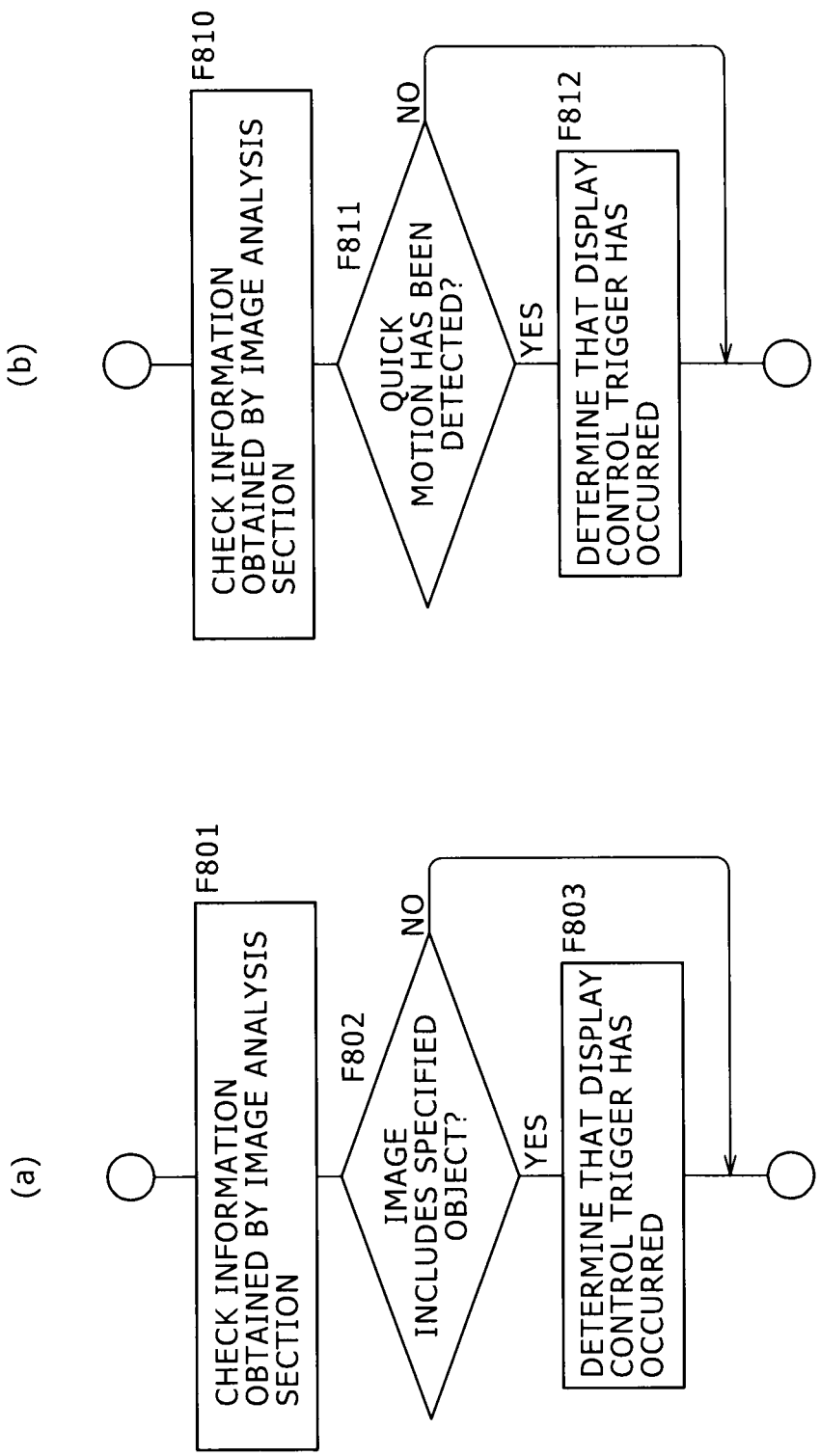
FIG. 20 shows flowcharts illustrating procedures for determining occurrence of a display control trigger according to one embodiment.

(a) of FIG. 20 also illustrates an exemplary procedure for determining the occurrence of the display control trigger based on the information obtained from the image analysis section 17.

At step F801 in (a) of FIG. 20, the system controller 10 monitors the information obtained from the image analysis section 17. It is assumed here that the image analysis section 17 analyzes the photographed image to determine whether or not the image data includes a specified object.

If, as a result of the image analysis, it is determined that the photographed image includes the specified object, the system controller 10 proceeds from step F802 to step F803, and determines that the display control trigger has occurred.

As a result of it being determined at step F803 that the display control trigger has occurred, control in the procedure of FIG. 13 performed by the system controller 10 proceeds from step F104 to step F107, and the system controller 10 instructs the display control section 14 to perform predetermined image processing.

Conceivable examples of image processing control in this case are as follows.

In the case where the specified object is a bird, for example, if a bird is detected in the image data, the system controller 10 may instruct the display image processing section 12 to highlight the bird in the image as illustrated in (c) of FIG. 12. As a result, the photographed image, the received image, or the reproduced image is displayed on the display section 2 in such a manner that the user can find the bird easily. Needless to say, this is not limited to the bird, but may be applied to any other animals.

In the case where the specified object is a person, if the person is detected in the image data, the system controller 10 may instruct the display image processing section 12 to allow the person to stand out in the image by highlighting the person, or to magnify the person, for example.

In the case where the specified object is a person, an animal, a structure, or the like, an image may be displayed in which only the specified object is displayed while a scene surrounding the specified object such as the person is blotted out entirely.

It is also conceivable that when a person is detected as the specified object, the image is processed so that only the person is blotted out in the image. For example, an image of a natural scene in which an artificial object such as a person, a car, or the like is excluded (masked) may be displayed. In this case, an interpolation process may be performed so that pixels corresponding to the specified object will be filled in using pixels that surround the specified object that is to be masked.

In the case where the specified object is a person or the like, it is also conceivable to apply an image effect such as mosaic display.

(b) of FIG. 20 also illustrates an exemplary procedure for determining the occurrence of the display control trigger based on the information obtained from the image analysis section 17.

At step F810 in (b) of FIG. 20, the system controller 10 monitors the information obtained from the image analysis section 17. The image analysis section 17 analyzes the photographed image to detect whether or not a quick motion is occurring in the image data. For example, the speed of a motion can be determined based on differences between frames of video data.

If, as a result of the image analysis, an object that moves fast is detected, the system controller 10 proceeds from step F811 to step F812, and determines that the display control trigger has occurred.

As a result of it being determined at step F812 that the display control trigger has occurred, control in the procedure of FIG. 13 performed by the system controller 10 proceeds from step F104 to step F107, and the system controller 10 instructs the display control section 14 to perform image processing.

For example, it is conceivable that, in order to enable the user to check the quick motion easily, the system controller 10 instructs the display control section 14 to perform image processing so that a stroboscopic display as illustrated in (c) of FIG. 9 will be presented.

It is also conceivable that the system controller instructs the display control section 14 to perform image processing such as highlighting or magnifying a quickly moving object to attract attention of the user to the quickly moving object.

In the case where the reproduced image data obtained from the storage section 25 is displayed, it is conceivable that the system controller 10 instructs the storage section 25 to perform slow playback to present a slow version of the quick motion to the user.

Figure 21:
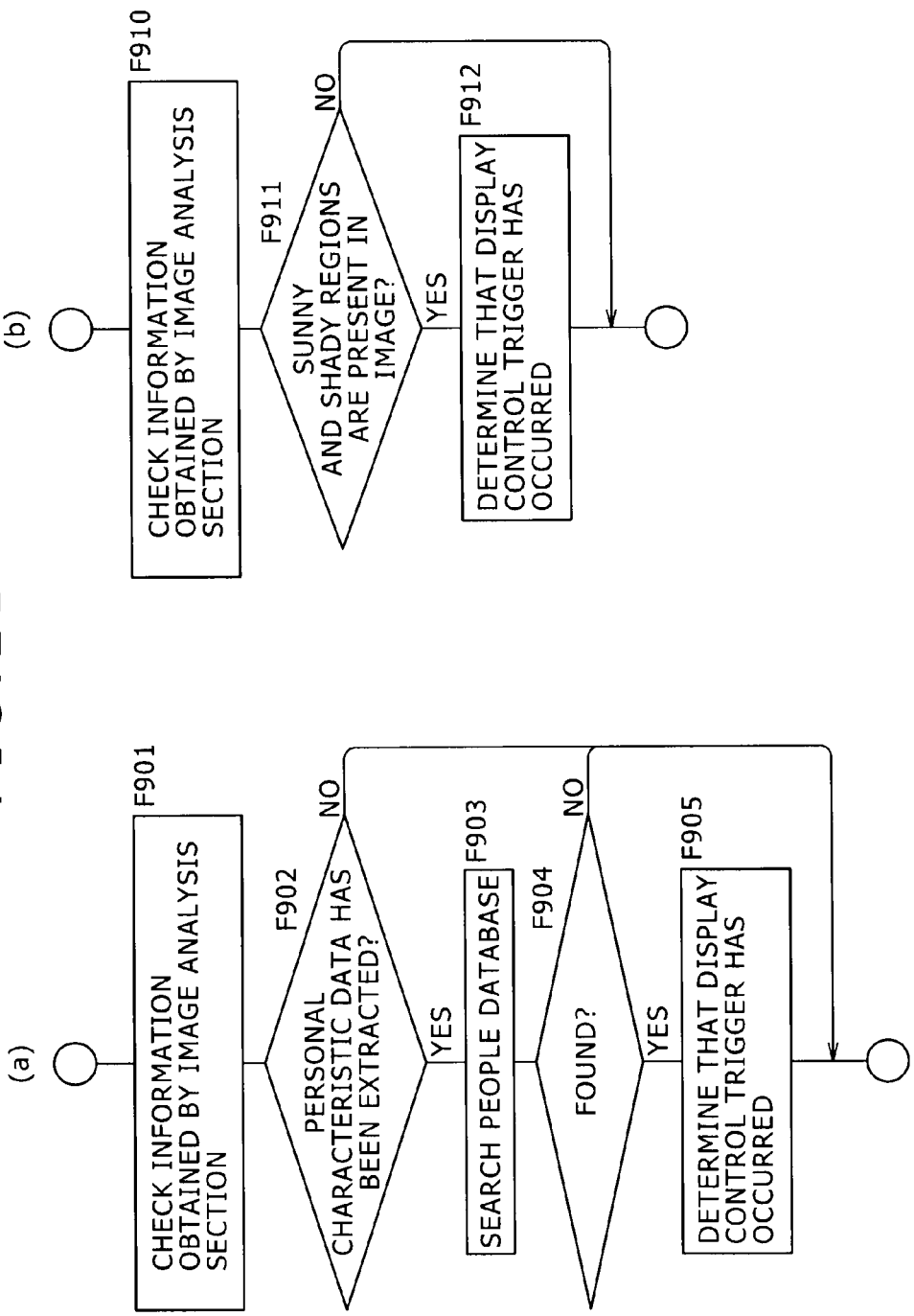
FIG. 21 shows flowcharts illustrating procedures for determining occurrence of a display control trigger according to one embodiment.

(a) of FIG. 21 also illustrates an exemplary procedure for determining the occurrence of the display control trigger based on the information obtained from the image analysis section 17. More particularly, in this exemplary procedure, when a person has been photographed, that person is identified.

At step F901 in (a) of FIG. 21, the system controller 10 monitors the information obtained from the image analysis section 17. The image analysis section 17 analyzes the photographed image to determine whether the image data includes the face of a person, and, if the photographed image includes the face of a person, generates the personal characteristic data from an image of the face. As noted previously, examples of the personal characteristic data include the ratio (Ed/EN) of the distance Ed between the eyes to the distance EN between the center of the eye and the nose, and the ratio (Ed/EM) of the distance Ed between the eyes to the distance EM between the center of the eye and the mouth.

If the personal characteristic data is extracted, the system controller 10 proceeds from step F902 to step F903, and searches for personal information based on the personal characteristic data.

For example, the system controller 10 transmits the personal characteristic data to the network server or the device that contains the people database via the communication section 26, and receives a result of search performed in the network server or the device that contains the people database for the personal information. In the case where the display apparatus 1 contains the people database, the system controller 10 is able to search the people database based on the personal characteristic data.

If the personal information on the specified person is found as a result of the search performed by the external device or the system controller 10 itself, the system controller 10 proceeds from step F904 to step F905, and determines that a display control trigger for displaying the personal information has occurred.

As a result of it being determined at step F905 that the display control trigger has occurred, control in the procedure of FIG. 13 performed by the system controller 10 proceeds from step F104 to step F107, and the system controller 10 instructs the display control section 14 to, for example, display the retrieved personal information so as to be superimposed on the image.

In the case where the photographed image, the reproduced image, or the received image being displayed includes a person whom the user met in the past or a celebrity who is registered in the people database, information on the person or celebrity (i.e., information registered in the people database, such as the name or position of the person or celebrity, a place at which the user met the person, or the like) is displayed on the display section 2 together with an image of the person or celebrity as a result of the above process, so that the user can recognize the person or celebrity accurately.

(b) of FIG. 21 also illustrates an exemplary procedure for determining the occurrence of the display control trigger based on the information obtained from the image analysis section 17. This exemplary procedure corresponds to the case where the image is hard to see because of the influence of the sunny and shady regions as illustrated in (a) of FIG. 12.

At step F910 in (b) of FIG. 21, the system controller 10 monitors the information obtained from the image analysis section 17. The image analysis section 17 analyzes the image data to determine whether or not bright and dark regions are present in the image because of sunlight.

If, when the photographed image, the reproduced image, or the received image is being displayed, the image analysis of the image data thereof determines that brightness variations are occurring in the image because of the presence of the sunny and shady regions, the system controller 10 proceeds from step F911 to step F912, and determines that the display control trigger has occurred.

As a result of it being determined at step F912 that the display control trigger has occurred, control in the procedure of FIG. 13 performed by the system controller 10 proceeds from step F104 to step F107, and the system controller 10 instructs the display control section 14 to perform image processing for eliminating the brightness variations caused by the sunny and shady regions, e.g., a partial change in display brightness level. As a result of this process, an image that is easy to see and which is not influenced by the sunny and shady regions significantly can be provided to the user as illustrated in (b) of FIG. 12, for example.

It is also conceivable that, in the case where the influence of a lamp in a house or a facility, for example, instead of the influence of the sunlight, causes significant partial brightness variations to occur in the image or makes the image partially unclear, the brightness control, the imaging sensitivity control, the contrast control, or the like with respect to a part of the image may be performed.

As the procedures of FIGS. 14 to 21, examples of the processes of processing, when displaying the photographed image, the reproduced image, or the received image, the display mode of the image to be displayed or the image data to be displayed in accordance with the outside world information have been described above, but these examples are only illustrative and not restrictive. A great variety of other examples are conceivable as examples of the determination of whether or not the display control trigger has occurred or examples of control.

As for the display control trigger, the outside world situation is detected based on the information obtained from the surrounding environment sensor 19, the imaging object sensor 20, the GPS receiver section 21, the date/time calculation section 22, the image analysis section 17, or the communication section 26, and if a predetermined condition is satisfied, it is determined that a trigger has occurred.

As examples of the control to be performed when it has been determined based on various conditions that the display control trigger has occurred, and as control to be exercised over the display image processing section 12, the following types of control can be performed in accordance with the outside world situation, for example: magnification/reduction control; control of the brightness, the contrast, the sharpness, or the like; display of an effect-applied image, such as the mosaic image, the brightness-reversed image, the soft-focus image, or the like; and control of the split screen display or the stroboscopic display as illustrated in FIG. 9.

A display mode that combines the through state and the image (i.e., the reproduced image, the received image, or the photographed image) is also conceivable. For example, the display section 2 may be caused to enter a semi-through state (about 50% transmissivity) while the image is displayed on the display section 2.

In the case where the photographed image obtained from the imaging function system is being displayed on the display section 2, it is conceivable that, as control of the operations of the imaging section 3 and the imaging signal processing section 15, a telephoto/wide-angle zooming process, control of the imaging sensitivity, switching of the imaging frame rate, change of infrared imaging sensitivity or ultraviolet imaging sensitivity, or the like is performed.

In the case where the reproduced image obtained from the storage section 25 or the received image obtained from the communication section 26 is being displayed on the display section 2, it is conceivable that the display control trigger is treated as a trigger for variable speed playback such as fast-forwarding/fast-reversing, cuing, frame advance, slow playback and pause, and as a trigger for page advance, page scroll, moving a selection on a list being displayed, cursor movement, a deciding operation, a game operation, or the like, and that the system controller 10 controls the storage section 25 or the communication section 26 to perform a desired operation.

That is, as conditions for determining that the display control trigger has occurred and control in accordance therewith, any combination of the above is conceivable.

Referring to (b) of FIG. 9, when the display on the display section 2 is switched in response to the occurrence of the display control trigger as described above, the area AR1 on the display section 2, where the screen is in the through state or the regular photographed image is being displayed, may be left unchanged while an image in a different mode is displayed in the area AR2, i.e., a part of the display section 2. Needless to say, conversely, an image in accordance with the display control trigger may be displayed in the wider area AR1 conversely. Also, it may be so arranged that the screen is divided into two equally-sized parts, and that the regular photographed image is displayed in one of the two parts while the image in accordance with the display control trigger is displayed on the other of the two parts.

Next, with reference to FIGS. 22 and 23, exemplary procedures for determining the occurrence of the source switch trigger at step F105 in FIG. 13 will now be described below.

Figure 22:
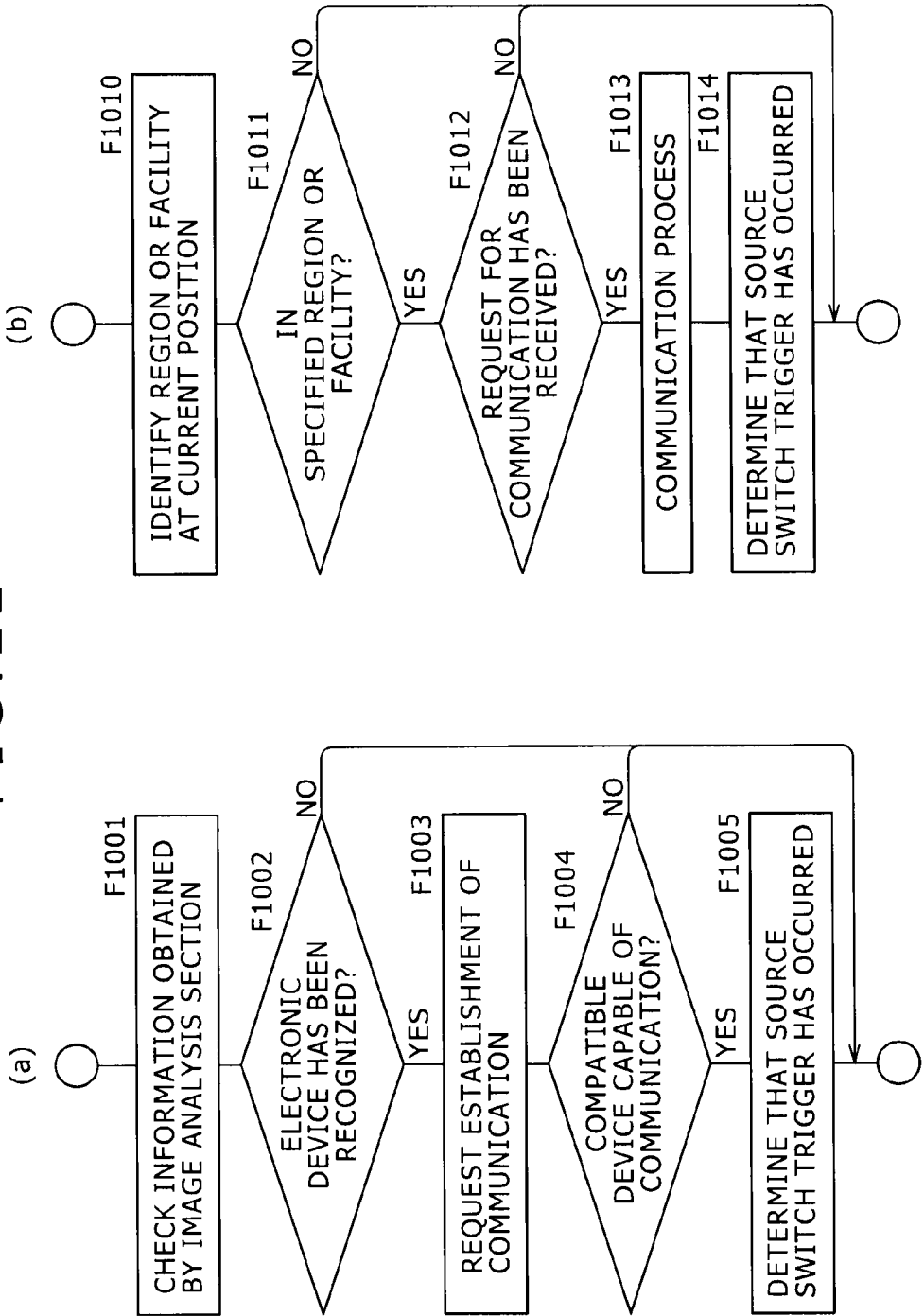
FIG. 22 shows flowcharts illustrating procedures for determining occurrence of a source switch trigger according to one embodiment.

(a) of FIG. 22 illustrates an exemplary procedure for determining the occurrence of the source switch trigger based on the analysis performed by the image analysis section 17.

At step F1001 in FIG. 22, the system controller 10 monitors the information obtained from the image analysis section 17. It is assumed here that the display apparatus 1 includes the imaging function system as illustrated in FIG. 3, and that the image analysis section 17 analyzes the image data of the image photographed by the imaging section 3 to detect whether or not the subject of the imaging section 3 includes an electronic device with which the display apparatus 1 is capable of communicating. For example, a device, such as the personal computer, the mobile phone, the AV equipment, or the PDA, with which the display apparatus may be capable of performing data communication is identified based on its appearance.

If, as a result of the image analysis, it is determined that the electronic device has been photographed, the system controller 10 proceeds from step F1002 to step F1003, and instructs the communication section 26 to transmit to the electronic device a request for establishment of communication. If the electronic device photographed is a device that is capable of communicating with the display apparatus 1 according to the present embodiment, a response to the request for the establishment of communication will be obtained, so that the communication is established between the display apparatus 1 and the electronic device. When it is determined that the external electronic device is a compatible device that is capable of communicating with the display apparatus 1 as described above, the system controller 10 proceeds from step F1004 to step F1005, and determines that a source switch trigger for designating the communication section 26 as the source has occurred.

As a result of it being determined at step F1005 that the source switch trigger has occurred, control in the procedure of FIG. 13 performed by the system controller 10 proceeds from step F105 to step F108, and the system controller 10 switches the image source to the communication section 26. As a result of this switching, the display section 2 will enter a state in which the image data received by the communication section 26 is displayed thereon.

The above process makes it possible, when an external device (e.g., the imaging apparatus 70 or the content source device 71 as illustrated in FIG. 2) with which the display apparatus 1 is capable of communicating exists in the surrounding area, to display the image received from the external device on the display section 2.

(b) of FIG. 22 illustrates an exemplary procedure for switching the source in response to a request transmitted from the external device at a specified place.

At step F1010 in (b) of FIG. 22, the system controller 10 transmits the information on the latitude and longitude of the current position obtained by the GPS receiver section 21 to the network server or the device that contains the map database via the communication section 26, and receives the information concerning the current position retrieved in the network server or the device that contains the map database. Note that in the case where the display apparatus 1 contains the map database, the system controller 10 is able to retrieve the information concerning the current position from this map database based on the information on the latitude and longitude of the current position obtained from the GPS receiver section 21.

Based on the acquired information concerning the current position, the system controller 10 determines whether or not the current position is within a specified region or facility. If it is determined that the current position is in the specified region or facility, the system controller 10 proceeds from step F1011 to step F1012, and determines whether or not a request for communication has been received from the external device. For example, the system controller 10 may wait for a predetermined time for the request for communication to be received from the external device.

If the request for communication has been received from the external device, the system controller 10, at step F1013, allows the communication section 26 to establish communication with the external device, and performs a communication operation.

When the communication operation is started, the system controller 10 determines at step F1014 that the source switch trigger for designating the communication section 26 as the source has occurred.

As a result of it being determined at step F1014 that the source switch trigger has occurred, control in the procedure of FIG. 13 performed by the system controller 10 proceeds from step F105 to step F108, and the system controller 10 switches the image source to the communication section 26 to display the image data received by the communication section 26 on the display section 2.

The above process makes it possible, when an external device (e.g., the imaging apparatus 70 or the content source device 71 as illustrated in FIG. 2) has accessed the display apparatus 1 in the specified region or facility, to display the image received from the external device on the display section 2.

For example, it is conceivable that a guide image, an alarm image, a service image of the region or facility is provided to the user.

It is also conceivable that, when the user is watching a sport, the image as illustrated in (a) of FIG. 7 provided by a promoter, for example, is provided to the user of the display apparatus 1.

It is also conceivable that, depending on the region, the bird's-eye view image as illustrated in (c) of FIG. 7 is provided to the user.

Figure 23:
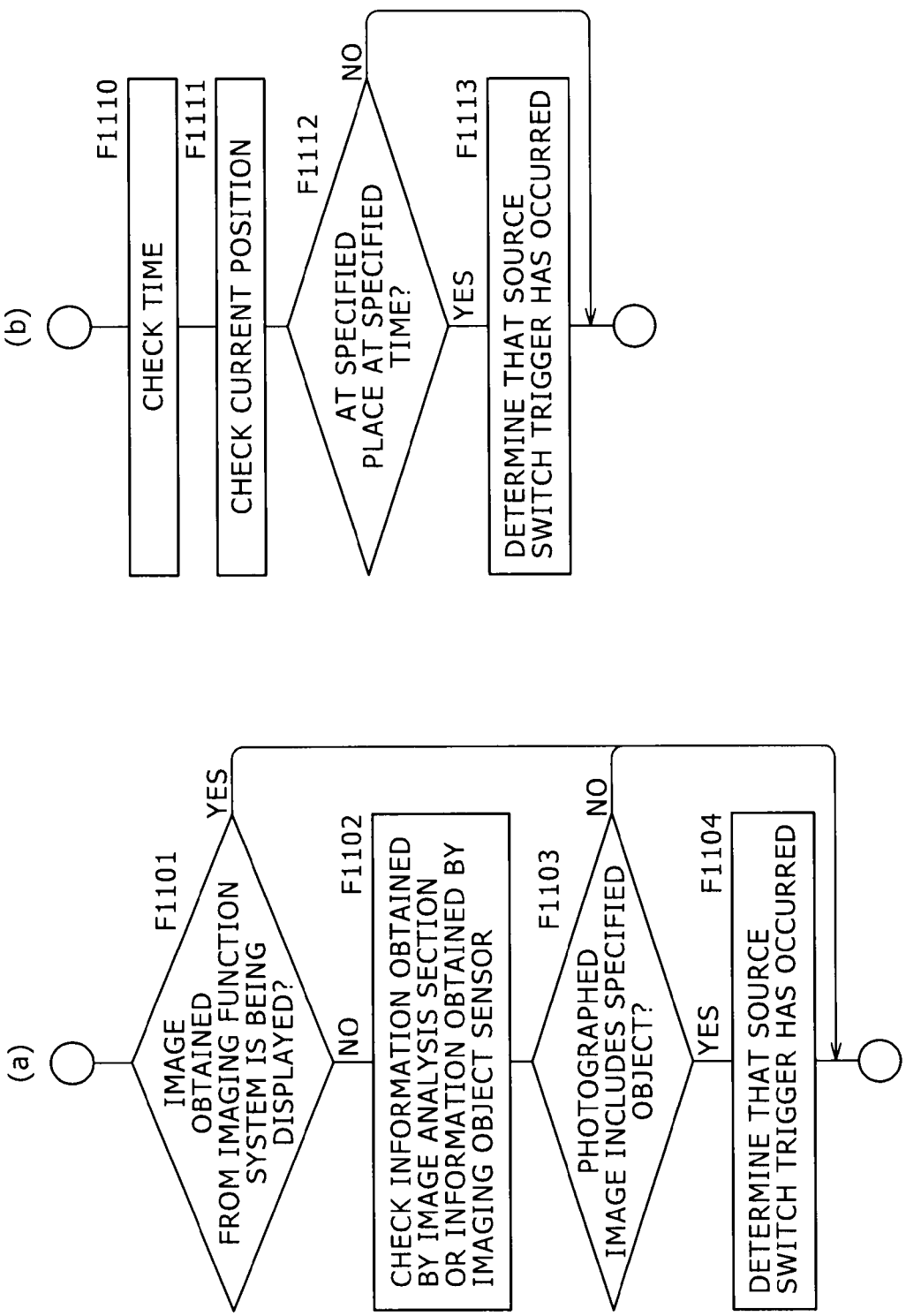
FIG. 23 shows flowcharts illustrating procedures for determining occurrence of a source switch trigger according to one embodiment.

(a) of FIG. 23 illustrates an exemplary procedure for determining the occurrence of the source switch trigger based on the analysis performed by the imaging object sensor 20 or the image analysis section 17. This exemplary procedure can be adopted when the display apparatus 1 has the imaging function system as illustrated in FIG. 3.

At step F1101 in (a) of FIG. 23, the system controller 10 determines whether or not the photographed image is being displayed on the display section 2 with the imaging function system as the source. When the photographed image is being displayed, the process of (a) of FIG. 23 is not performed. Meanwhile, when the image reproduced in the storage section 25 or the image received by the communication section 26 is being displayed on the display section 2, for example, the system controller 10 proceeds to step F1102.

At step F1102, the system controller 10 monitors the information obtained from the image analysis section 17 or the information obtained from the imaging object sensor 20. It is assumed here that the image analysis section 17 is analyzing the data of the image photographed by the imaging section 3, and detects whether the photographed image includes a specified object as a subject of the imaging section 3. Examples of the specified object include a person, an animal, a structure, and a natural object. Alternatively, it may be so arranged that the imaging object sensor 20 is the pyroelectric sensor, and that it is determined whether or not the imaging object is a living body such as a person or an animal as the specified object.

If the system controller 10 determines, based on the information obtained from the image analysis section 17 or the information obtained from the imaging object sensor 20, that the photographed image includes the specified object, the system controller 10 proceeds from step F1103 to step F1104, and determines that a source switch trigger for designating the imaging function system (i.e., the imaging section 3 and the imaging signal processing section 15) as the source has occurred.

As a result of it being determined at step F1104 that the source switch trigger has occurred, control in the procedure of FIG. 13 performed by the system controller 10 proceeds from step F105 to step F108, and the system controller 10 switches the image source to the imaging function system to display the image photographed by the imaging section 3 on the display section 2.

The above process makes it possible, when the specified object appears in front of the user while the user is viewing the reproduced image or the received image, for example, to switch the display on the display section 2 to the photographed image.

(b) of FIG. 23 illustrates an exemplary procedure for determining the occurrence of the source switch trigger based on the time and the current position.

At step F1110 in (b) of FIG. 23, the system controller 10 acquires the current time from the date/time calculation section 22. At step F1111, the system controller 10 acquires the information on the current position based on the latitude and longitude of the current position obtained by the GPS receiver section 21.

At step F1112, the system controller 10 determines whether or not the current time is a specified time and the user is currently at a specified place. If it is determined at step F1112 that the user is at the specified place at the specified time, the system controller 10 proceeds to step F1113, and determines that the source switch trigger has occurred.

As a result of it being determined at step F1113 that the source switch trigger has occurred, control in the procedure of FIG. 13 performed by the system controller 10 proceeds from step F105 to step F108, and the system controller 10 switches the image source.

For example, when the user is at the specified place at the specified time, the image source may be switched to the storage section 25, so that the image reproduced in the storage section 25 is displayed.

Alternatively, when the user is at the specified place at the specified time, the image source may be switched to the imaging function system, so that the photographed image is displayed.

Alternatively, when the user is at the specified place at the specified time, the image source may be switched to the communication section 26, so that the image received by the communication section 26 is displayed. This operation can be applied to a service provided by a content service system that provides a content at the specified place at the specified time.

As the procedures of FIGS. 22 and 23, examples of the processes of determining whether or not the source switch trigger has occurred based on the outside world information have been described above, but these examples are only illustrative and not restrictive. A great variety of other examples are conceivable as examples of the determination of whether or not the source switch trigger has occurred.

The determination of whether the source switch trigger has occurred makes it possible to switch the image source in accordance with the situation, so that an image appropriate for the user can be provided to the user.

Returning to FIG. 13, the occurrence of the display start trigger determined at step F102 and the occurrence of the display termination trigger determined at step F106 may also be determined by the system controller 10 based on the outside world information.

For example, it may be so arranged that the brightness of the surroundings is detected as in the procedure of FIG. 14, and that when it is determined that it is dark in the surroundings, the system controller 10 determines that the display start trigger has occurred, and accordingly switches from the through state to a displaying state in which the image is displayed.

It may be so arranged that the weather is detected as in the procedure of FIG. 15, and that the system controller 10 determines whether the display start trigger has occurred in accordance with the detected weather.

It may be so arranged that the temperature and humidity are detected as in the procedure of FIG. 16, and that the system controller 10 determines that the display start trigger has occurred when a predetermined condition is satisfied.

It may be so arranged that the occurrence of the display start trigger is determined based on the time period, the month and day, the season, or the like as in the procedure of FIG. 17.

It may be so arranged that the occurrence of the display start trigger is determined when the current position has become a predetermined place as in the procedure of FIG. 18. This makes it possible to activate a display function at a specified place or based on the type of the facility.

In the case where the information obtained by the image analysis section 17 is detected as in the procedures of FIGS. 19 to 21, and when the image analysis section 17 analyzes the photographed image data, the occurrence of the display start trigger may be determined when the specified object is detected, when the quick motion is detected, when the specified person is detected, or when brightness variations are detected, for example.

In the case where the occurrence of a trigger for starting monitor display is determined in such manners as described above and control in the procedure of FIG. 13 is caused to proceed to step F103 when it is determined that the trigger has occurred, the user, who is wearing the display apparatus 1 whose display section 2 is in the through state, will see the display operation started in accordance with the situation without the need for the user to perform any particular operation, and the user will be able to view an image suited to the situation.

The occurrence of the display termination trigger may also be determined in similar manners.

In the case where the brightness of the surroundings is detected as in the procedure of FIG. 14, for example, the occurrence of the display termination trigger may be determined based on the brightness of the surroundings.

It may be so arranged that the weather is detected as in the procedure of FIG. 15, and that the system controller 10 determines whether the display termination trigger has occurred in accordance with the detected weather.

It may be so arranged that the temperature and humidity are detected as in the procedure of FIG. 16, and that the system controller 10 determines that the display termination trigger has occurred when a predetermined condition is satisfied.

It may be so arranged that the occurrence of the display termination trigger is determined based on the time period, the month and day, the season, or the like as in the procedure of FIG. 17.

It may be so arranged that the occurrence of the display termination trigger is determined when the current position has become a predetermined place as in the procedure of FIG. 18. This makes it possible to deactivate the display function at a specified place or based on the type of the facility.

In the case where the information obtained by the image analysis section 17 is detected as in the procedures of FIGS. 19 to 21, and when the image analysis section 17 analyzes the photographed image data, the occurrence of the display termination trigger may be determined based on a result of the analysis.

In the case where the occurrence of a trigger for terminating the monitor display is determined in such manners as described above and control in the procedure of FIG. 13 is caused to return to step F101 when it is determined that the trigger has occurred, the display section 2 of the display apparatus 1 is able to automatically enter the through state when the need felt by the user for the monitor display has been reduced or eliminated, or when the user desires to prohibit a monitor display function, for example.

[6. Effects of Embodiments, Exemplary Variants, and Exemplary Expansions]

Embodiments of the present invention have been described above. In the above-described embodiments, the image is displayed in front of the eyes of the user via the display section 2 attached to the spectacle-shaped or head-mounted wearing unit, and based on the outside world information, such as the brightness of the surroundings as the outside world situation, the weather, a condition of the subject, recognition of the specified object in the image data, the motion of the object, the place, or the date and time, the control of the display operation or the selection of the display source is performed, so that an accurate display operation suited to the situation or an entertaining display operation is performed without the need for the user to perform any operation. Thus, the display apparatus 1 is a convenient apparatus for the user, and is capable of providing a variety of scenes within his or her field of vision.

Moreover, the transmissivity of the display section 2 can be controlled to cause the display section 2 to enter the transparent or translucent through state. This serves to prevent an interference from occurring in the user's daily life even while the user is wearing the display apparatus 1 via the wearing unit. Thus, advantages of the display apparatus 1 according to the above-described embodiments can be enjoyed effectively in the user's daily life.

In the above-described embodiments, control concerning the display operation, among others, has been described. Note, however, that switching between power-on, power-off, and standby states, control of the volume or sound quality of the audio outputted via the audio output section 5, or the like may be performed based on the outside world information. For example, it is conceivable that the volume control is performed in accordance with the time or place, or that the volume of surrounding sound is detected and the volume of a speaker output is controlled in accordance with the detected volume of the surrounding sound.

Note that the appearance and structure of the display apparatus 1 are not limited to those illustrated in FIGS. 1, 3, and 4, but that various variants are possible.

The example that the spectacle-shaped or head-mounted wearing unit being included as the display image 1 is described above; however, the display apparatus of the present invention has only to be configured to display the image in front of the eye(s) of the user, and it may be the wearing unit used for the user to wear the display apparatus of any type, such as a headphone type, a neckband type, a behind-the-ear type, or the like. Further, the display apparatus may be attached to common spectacles, visor, headphone, or the like via a fixing device such as a clip so that the display apparatus will be worn by the user.

The invention claimed is:

1. A display apparatus, comprising:
   a wearing member having at least one eye piece, the wearing member configured to be fitted around a head of a user;
   a display provided within the at least one eye piece and operating in a displaying state for displaying an image, and operating in a transparent or translucent through state for displaying a field of view of the user; and
   circuitry configured to:
      communicate with an external device located remotely from the display apparatus to receive an image that has been captured by the external device;
      acquire a plurality of outside world information, wherein each of the plurality of the outside world information has a corresponding operation to be performed on the display, and the plurality of outside world information includes at least brightness, temperature, humidity, atmospheric pressure, and weather of surroundings of the display apparatus;
      display the captured image;
      adjust the display based on the plurality of outside world information while the display continues to display the captured image such that the user does not need to operate an operation member in relation to the adjustment of the display; and
      control split screen display performed in the display where the image captured by the external device is displayed in a first portion of the display, and a second portion of the display is separate and distinct from the first portion and includes the transparent or translucent through state for displaying the field of view of the user,
   wherein the corresponding operation includes at least brightness level control, color correction, contrast control, sharpness or edge enhancement control, applying an image effect, and control of the split screen display.

2. The display apparatus according to claim 1, further comprising:
   an imager for photographing an image.

3. The display apparatus according to claim 2, wherein, based on the acquired outside world information, the circuitry is configured to control the image photographed to be displayed on said display.

4. The display apparatus according to claim 2, further comprising a sensor for detecting information concerning an imaging object of said imager as the outside world information.

5. The display apparatus according to claim 1, wherein the circuitry is further configured to:
   reproduce data from a storage medium.

6. The display apparatus according to claim 5, wherein, based on the acquired outside world information, the circuitry is configured to control the reproduced data to be displayed on said display.

7. The display apparatus according to claim 1, wherein, based on the acquired outside world information, the circuitry is configured to control data received to be displayed on said display.

8. The display apparatus according to claim 1, further comprising a sensor for detecting a situation of a surrounding environment as the outside world information.

9. The display apparatus according to claim 1, wherein the circuitry is configured to acquire current position information as the outside world information.

10. The display apparatus according to claim 1, wherein the circuitry is configured to acquire a current date and time as the outside world information.

11. The display apparatus according to claim 1, wherein the circuitry is configured to acquire the outside world information via communication with an external device.

12. The display apparatus according to claim 1, wherein the circuitry is configured to acquire the outside world information via image analysis performed on input image data.

13. The display apparatus according to claim 1, wherein the acquired outside world information is information on a place corresponding to a current position.

14. The display apparatus according to claim 1, wherein the acquired outside world information is information on a structure or natural object in an area corresponding to a current position.

15. The display apparatus according to claim 1, wherein the acquired outside world information is information for identifying a specified object included in input image data.

16. The display apparatus according to claim 1, wherein the acquired outside world information is information for identifying a person, an animal, a structure, a natural object, or a device as a specified object included in input image data.

17. The display apparatus according to claim 1, wherein the acquired outside world information is information on a motion of an object image included in input image data.

18. The display apparatus according to claim 1, wherein the acquired outside world information is information for identifying an individual person included in input image data.

19. The display apparatus according to claim 1, wherein the acquired outside world information is information for determining whether or not input image data includes a letter image.

20. The display apparatus according to claim 1, wherein the acquired outside world information is information on brightness or clearness of input image data.

21. The display apparatus according to claim 1, wherein the acquired outside world information is information on brightness or clearness of a part of an image of input image data.

22. The display apparatus according to claim 1, wherein the circuitry is further configured to control start/termination of a display operation in said display.

23. The display apparatus according to claim 1, wherein
said display is capable of switching between the transparent or translucent through state and the displaying state in which data supplied is displayed, and
the circuitry is configured to control said display to switch between the through state and the displaying state.

24. The display apparatus according to claim 1, wherein the circuitry is configured to control switching of a source from which data to be displayed on said display is supplied.

25. The display apparatus according to claim 1, wherein the circuitry is configured to control magnification/reduction of the image displayed on said display.

26. The display apparatus according to claim 1, wherein the circuitry is configured to control highlighting of a part of a screen displayed on said display.

27. The display apparatus according to claim 1, wherein the circuitry is configured to control display brightness in said display.

28. The display apparatus according to claim 1, wherein the circuitry is configured to control signal processing performed on a signal of the image to be displayed by said display.

29. The display apparatus according to claim 1, wherein the circuitry is further configured to:
perform speech synthesis based on a letter included in the image to be supplied to said display; and
output audio generated by said speech synthesis.

30. A display method employed in a display apparatus that includes a wearing member having at least one eye piece, the wearing member configured to be fitted around a head of a user, the at least one eye piece including a display provided within the at least one eye piece and operating in a displaying state for displaying an image, and operating in a transparent or translucent state for displaying a field of view of the user, the method comprising:
communicating with an external device located remotely from the display apparatus to receive an image that has been captured by the external device;
acquiring a plurality of outside world information, wherein each of the plurality of the outside world information has a corresponding operation to be performed on the display, and the plurality of outside world information includes at least brightness, temperature, humidity, atmospheric pressure, and weather of surroundings of the display apparatus;
displaying the captured image;
adjusting the display based on the plurality of outside world information while the display continues to display the captured image such that the user does not need to operate an operation member in relation to the adjustment of the display; and
control split screen display performed in the display where the image captured by the external device is displayed in a first portion of the display, and a second portion of the display is separate and distinct from the first portion and includes the transparent or translucent through state for displaying the field of view of the user,
wherein the corresponding operation includes at least brightness level control, color correction, contrast control, sharpness or edge enhancement control, applying an image effect, and control of the split screen display.

31. A display apparatus, comprising:
a wearing unit having at least one eye piece, the wearing unit configured to be fitted around a head of a user;
display means provided within the at least one eye piece and operating in a displaying state for displaying an image, and operating in a transparent or translucent through state for displaying a field of view of the user;
reception means for communicating with an external device located remotely from the display apparatus to receive an image that has been captured by the external device;
outside world information acquisition means for acquiring a plurality of outside world information, wherein each of the plurality of outside world information has a corresponding operation to be performed on the display means, and the plurality of outside world information includes at least brightness, temperature, humidity, atmospheric pressure, and weather of surroundings of the display apparatus;
displaying means for displaying the captured image;
adjusting means for adjusting the display means based on the plurality of outside world information while the display means continues to display the captured image such that the user does not need to operate an operation member in relation to the adjustment of the display means; and control means for controlling split screen display performed in the display means where the image captured by the external device is displayed in a first portion of the display means, and a second portion of the display means is separate and distinct from the first portion and includes the transparent or translucent through state for displaying the field of view of the user, wherein the corresponding operation includes at least brightness level control, color correction, contrast control, sharpness or edge enhancement control, applying an image effect, and control of the split screen display.

* * * * *